US008861744B1

(12) United States Patent
Solomon et al.

(10) Patent No.: US 8,861,744 B1
(45) Date of Patent: Oct. 14, 2014

(54) DISTRIBUTED AUDIO SYSTEM

(75) Inventors: David Solomon, Portland, OR (US); Shaun Fagan, Sherwood, OR (US); Jim Arbuckle, Tualatin, OR (US); Don Hammer, Tualatin, OR (US); David M. Jordahl, Estacada, OR (US); Thomas J. Koller, Beaverton, OR (US); Michael A. Frost, Portland, OR (US)

(73) Assignee: Lightspeed Technologies, Inc., Tualatin, OR (US)

( * ) Notice: Subject to any disclaimer, the term of this patent is extended or adjusted under 35 U.S.C. 154(b) by 490 days.

(21) Appl. No.: 13/189,405

(22) Filed: Jul. 22, 2011

Related U.S. Application Data

(60) Provisional application No. 61/453,039, filed on Mar. 15, 2011.

(51) Int. Cl.
*H04B 3/00* (2006.01)

(52) U.S. Cl.
USPC ............. 381/80; 434/350; 434/351; 434/352; 709/208; 455/517; 455/557

(58) Field of Classification Search
CPC ..... G09B 5/04–5/08; G09B 7/00; H04N 7/14; H04N 20/28; H04R 3/12; H04R 1/02; H04R 2227/005; H04R 7/04; H04H 60/91; H04H 60/92
USPC ................. 381/379, 80, 308, 332, 76, 77, 85; 434/169, 336, 350, 351; 370/260, 270, 370/263; 709/208; 455/517, 557
See application file for complete search history.

(56) References Cited

U.S. PATENT DOCUMENTS

| | | | | |
|---|---|---|---|---|
| 5,823,788 | A * | 10/1998 | Lemelson et al. | 434/350 |
| 6,741,720 | B1 | 5/2004 | Myatt | |
| 7,079,028 | B2 | 7/2006 | Herrmann et al. | |
| 7,778,434 | B2 * | 8/2010 | Juneau et al. | 381/328 |
| 7,999,226 | B1 | 8/2011 | Koller et al. | |
| 8,483,757 | B2 * | 7/2013 | Bodley et al. | 455/557 |
| 2004/0161728 | A1 * | 8/2004 | Benevento et al. | 434/118 |
| 2004/0234088 | A1 | 11/2004 | McCarty et al. | |
| 2005/0027539 | A1 * | 2/2005 | Weber et al. | 704/275 |
| 2006/0065859 | A1 | 3/2006 | Lapstun et al. | |

FOREIGN PATENT DOCUMENTS

GB 2463924 * 6/2008 ............. H04R 27/00

OTHER PUBLICATIONS

Notice of Allowance issued in related U.S. Appl. No. 11/805,986, filed May 25, 2007; issued as U.S. Patent No. 7,999,226 Aug. 16, 2011.
Allowed Claims for U.S. Appl. No. 11/805,986, issued as U.S. Patent No. 7,999,226.
Product Information concerning prior art products obtained from the website of Revolabs Inc.

* cited by examiner

*Primary Examiner* — Davetta W Goins
*Assistant Examiner* — Oyesola C Ojo
(74) *Attorney, Agent, or Firm* — Klarquist Sparkman, LLP

(57) ABSTRACT

One or more wireless speaker units can be distributed through a room, such as a classroom. One or more instructor units can communicate with the speaker unit via base station. Audio pathways can selectively be provided between speaker units, between speaker units and instructor units and between instructor units. A remote control can be used to control the available audio pathways.

18 Claims, 33 Drawing Sheets

DAS USE-CASE SCENARIO #1, VARIATION #1:
DIRECTED BILATERAL AUDIO LINKS TO TWO INDEPENDENT INSTRUCTIONAL GROUPS
(THIS IS ESSENTIALLY THE SAME AS MONITORING A SPECIFIC POD EXCEPT THE AUDIO CONNECTION IS UNIDIRECTIONAL.)

DAS USE-CASE SCENARIO #1, VARIATION #2:
DIRECTED BILATERAL AUDIO LINKS TO TWO INDEPENDENT INSTRUCTIONAL GROUPS
(THIS IS ESSENTIALLY THE SAME AS MONITORING A SPECIFIC POD EXCEPT THE AUDIO CONNECTION IS UNIDIRECTIONAL.)

DAS USE-CASE SCENARIO #1, VARIATION #3:
DIRECTED BILATERAL AUDIO LINKS TO TWO INDEPENDENT INSTRUCTIONAL GROUPS
(THIS IS ESSENTIALLY THE SAME AS MONITORING A SPECIFIC POD EXCEPT THE AUDIO CONNECTION IS UNIDIRECTIONAL.)

DAS USE-CASE SCENARIO #1, VARIATION #4:
DIRECTED BILATERAL AUDIO LINKS TO TWO INDEPENDENT INSTRUCTIONAL GROUPS
(THIS IS ESSENTIALLY THE SAME AS MONITORING A SPECIFIC POD EXCEPT THE AUDIO CONNECTION IS UNIDIRECTIONAL.)

DI USE-CASE SCENARIO #1:
DIRECTED BILATERAL AUDIO LINKS TO TWO INDEPENDENT INSTRUCTIONAL GROUPS

DI USE-CASE SCENARIO #2, VARIATION #1:
TEACHERS ADDRESSING THE WHOLE CLASS ALSO WHILE USING A WIRELESS MULTIMEDIA BRIDGE

DI USE-CASE SCENARIO #2, VARIATION #2:
TEACHERS ADDRESSING THE WHOLE CLASS (IN LARGE ROOM)

DI USE-CASE SCENARIO #2, VARIATION #3:
TEACHERS ADDRESSING THE WHOLE CLASS ALSO WHILE USING A WIRELESS MULTIMEDIA BRIDGE (IN LARGE ROOM)

DI USE-CASE SCENARIO #3, VARIATION #2:
SELECTED POD ADDRESSING THE WHOLE CLASS (IN LARGE ROOM)

DISTRIBUTED AUDIO SYSTEM

CROSS REFERENCE TO RELATED APPLICATION

This application claims the benefit of U.S. Provisional Application Ser. No. 61/453,039, entitled DISTRIBUTED AUDIO SYSTEM, filed on Mar. 15, 2011, which is incorporated by reference herein.

TECHNICAL FIELD

This disclosure relates to audio systems comprised of plural speaker stations or units coupled to a base station and to an instructor station or unit.

DETAILED DESCRIPTION

Figure 1:
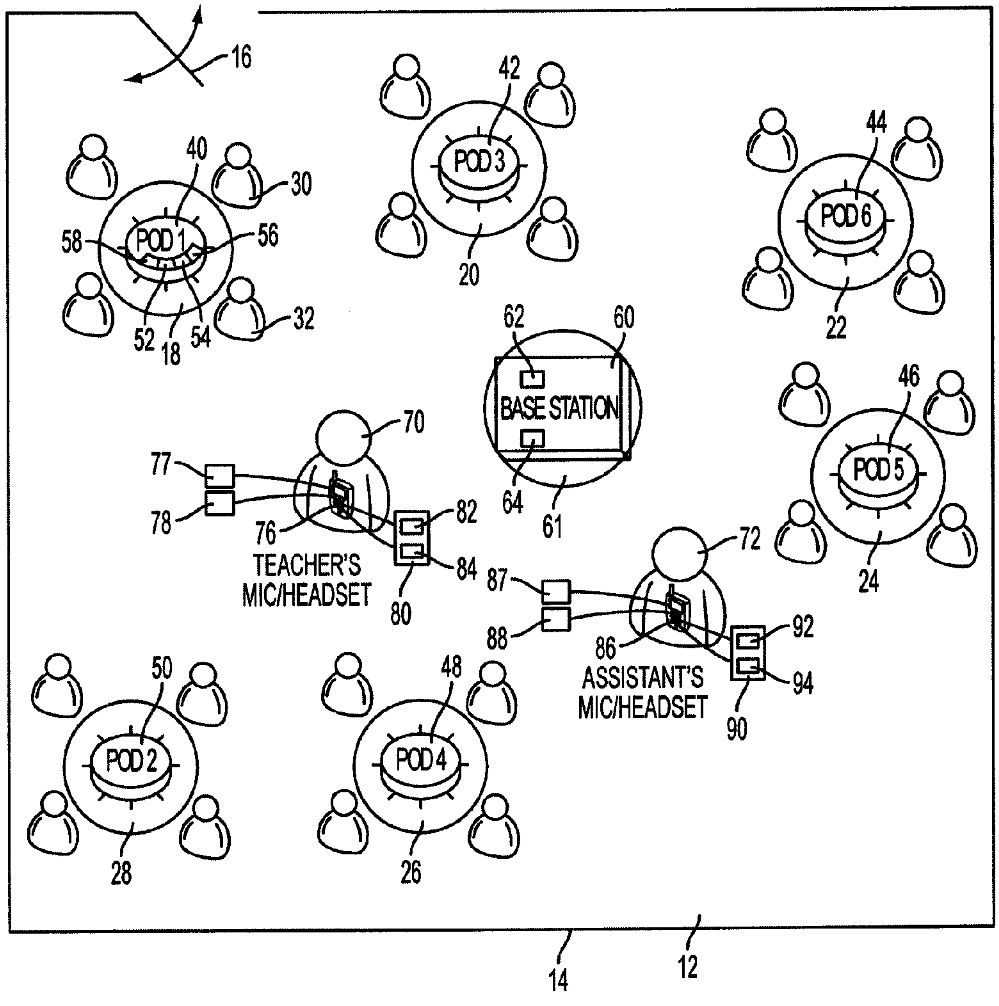
FIG. 1 depicts a typical system deployment of the DAS.

The description proceeds with reference to a number of exemplary embodiments, which are not to be viewed as limiting the scope of the invention. It should be noted that the invention is directed to novel and non-obvious aspects of the system and methods implemented by the system both alone and in sub-combinations with one another. In addition, the invention also encompasses novel and non-obvious aspects of individual system components.

For purposes of this description, the terms instructor and teacher are to be broadly construed to mean not only teachers in a classroom, but other individuals, such as individuals who are overseeing or directing an event such as a workshop, lecture, or other activity such as where attendees in the room are broken up into a plurality of small groups. Thus, individuals such as leaders, emcees, directors, overseers and other individuals fall under the definition of instructor even if they are not technically teaching or providing instruction to attendees. In the same manner, the term student or students are to be broadly construed to include any individuals who are involved in using a system. However, a distributed audio system has particular applicability to a classroom learning environment where both distributed and large group teaching of students in a classroom is taking place. To the extent the examples described herein are referring to a classroom or teaching environment, this is to be desirable, but not a limitation on the applicability of the system.

In this disclosure the words “a” and “an” are to be construed to include the singular and the plural unless otherwise stated such as by using the word only. Thus, if there are a plurality of particular elements, there is also "a" or "an" of the particular elements. In addition the phrase "coupled to" encompasses direct connection elements as well as indirect connection of elements through one or more other elements. Also, the term blocked with reference to audio pathways simply means that audio information does not pass along the pathway, whether a physical path is interrupted or audio information is not flowing through the path. Also, a pathways can include, but are not limited to channels, such as an RF frequency channels, but can also include data flow paths such as where data passes along a common path with the data being coded or otherwise separable with the separated data being deemed to have passed along a respective associated pathway. Audio pathways also include audio links between components. In addition, the phrase "each element includes" does not preclude the presence of other similar elements that lack some of the components specified by the phrase "each element includes" as the other similar elements would not be within the phrase "each element includes" if it lacks some of the included items. As a specific example, the phrase each speaker unit of a system includes a speaker and a transmitter does not preclude the existence of speakers in the system without transmitters as the speakers without transmitters would not in this example be speaker units. Also, the term "and/or" is to be broadly construed to include "and", "or" and both "and" and "or".

By way of example, Distributed Audio Systems (DAS) are meant to facilitate newly emerging teaching methodologies which redefine the way teachers and students interact within the classroom. In this new environment, teachers balance whole-group instruction with managing several small groups of students by orchestrating instructional and collaborative activities. The dispersal of the students into separate groups places a greater demand on teachers to be more mobile and better able to redirect their attention across a wider field. A DAS allows the teacher to provide basic learning and setup instructions for small group activities and desirably then to selectively monitor and address each group individually. Furthermore, this can be done without the teacher needing to be in close proximity to the selected group.

Differentiated instruction requires teachers to tailor their instruction and adjust to students' needs rather than expecting students to modify themselves to fit the curriculum. Because each student comes to school with a different set of needs, teachers must qualitatively match students' abilities and learning styles with appropriate material, including a blend of whole group, small group, and individual instruction. Regardless of whole group, small group, or individual instruction, it is the teacher's role to instruct, monitor behavior, and assess competence of individual students.

Whole group instruction is inherently a more straight forward teaching methodology—delivering one lesson to the entire classroom simultaneously. All students are expected to be engaged in what the teacher is saying, making it easier to determine on-task vs. off-task behavior. Certainly, there are specific subject areas or portions of subject areas that are perfectly acceptable to deliver to the whole class. At the beginning of the day or during a transition to the new area, it might make sense to set the lesson up to the entire class before breaking into smaller groups.

One of the challenges with this methodology is it is difficult for all students to clearly hear the lesson. But the other, perhaps more significant problem is the dramatic diversity of academic skill development, learning styles, languages, and cultural context that is present within a single classroom. The principles of Differentiated instruction tell us that you can't possibly meet all students at their point of need with a single lesson.

Small group instruction can be used to group students together based on similar academic skills or learning styles so that they are essentially equal in their development and can digest content at the same rate or level. In classroom, one typically have students at different levels of ability in a subject. In a math lesson for example, some groups be just learning the basic parts of fractions, while other groups might be working on complex story problems to apply their understanding of fractions to real life situations. Another way to group students would be a hybrid of students at different levels. This would be more of a peer-to-peer instruction model where perhaps those at higher levels help others. This can also be effective as students can often times learn better from their peers and the teaching of content can lead to mastery.

One of the largest challenges with small group instruction is the management of classroom activities and ongoing assessment of the students. DAS embodiments can allow the teacher immediate audio access to all students in the class, both for monitoring and directing student activity.

A typical classroom setup might be structured in the following way:

35% of the day=whole group; 65%=small group.

1 teacher is most common—there are cases where there might be an assistant, volunteer, or subject specialist off and on.

3-5 student groups located at stations in the room.

Additional students might be doing individual work like silent reading, guided activities on a computer, or independent worksheets.

Students sometimes rotate from station to station. The stations could be large tables, small desks pushed together, or a carpeted area on the floor.

Depending on teaching-styles or subject matters the teacher could be doing any of the following:

- Staying in one station with the students rotating to the teacher
- Rotating to the different stations throughout a lesson to work with each of the groups
- Roaming the classroom helping individual groups as they need it, and assessing the activities DAS embodiments desirably comprise of multiple portable speaker units that can be placed with each individual group in the classroom. The teacher desirably has a microphone and control that will help manage the activities in the classroom. DAS can give the teacher the ability to address any of plural different groups individually (for example, six such groups of six speaker units are included one illustrated system) regardless of where she/he is located, so as not to disturb the entire class. The teacher can monitor small group activities to assess the learning and redirect when necessary. When the teacher needs to address the full class, she/he can do so by talking to all speaker pods in the classroom. More so than an audio system, DAS can become a classroom management tool that allows a teacher facilitate a small-group learning environment.

Key highlights of this approach include one or more, and desirably all, of the following:

Teacher can audibly address any one of the groups individually.

When the teacher is providing direct instruction to one group, the speaker pod provides improved speech intelligibility in an often noisy environment.

- Two way communication between small groups and the teacher allows for quick conversations.
- Teacher can address all pods at once to allow for whole group instruction.
- Teacher monitoring of all small groups from anywhere in the classroom.
- Teacher can monitor groups without them knowing—behavior does not change.
- Allows for continuous, ongoing assessment.
- Student microphone at each group, eliminating the need and inconvenience of a pass-around microphone—one pod can broadcast to all pods.
- Allows for plural (e.g. two) teacher microphones to work in one classroom.

With reference to FIG. 1, a classroom 12 is shown bounded by a wall 14 and having a door 16. Within the classroom a plurality of groups of students are gathered about different tables, six such tables being shown in FIG. 1 and labeled with the numbers 18 through 28. As an example, four students are shown seated at each table (two students at table 18 being designated by the numbers 30, 32). Of course, the number of students per group can be varied as well as the number of groups. In a typical distributed learning environment, there will be at least two separate groups.

Loosely placed on each table is a respective speaker unit, with speaker unit 40 being placed on table 18, speaker unit 42 being placed on table 20, speaker unit 44 being placed on table 22, speaker unit 46 being placed on table 24, speaker unit 48 being placed on table 26 and speaker unit 50 being placed on table 28. These speaker units are alternatively designated as Pods 1-6 in FIG. 1 and are sometimes also referred to herein as speaker pods. The speaker units are desirably portable and, although they may be detachably mounted to a table for security reasons, they are more desirably simply resting on a support such as a table without any fasteners.

The speaker units desirably each comprise a speaker microphone, which can be a plurality of microphones, with one such speaker unit microphone for speaker unit 40 being indicated at 52 in FIG. 1. Desirably the speaker unit microphone, or microphones if a plurality of microphones are included in a speaker unit, have a limited range to pick up sound only from the immediate vicinity of the speaker unit, such as within about three to four feet of the speaker unit. These speaker units desirably further comprise a wireless speaker unit transmitter, such as indicated at 54 for speaker unit 40. Transmitter 54 transmits audio signals corresponding to the audio detected or picked up by speaker microphone 52. In addition the speaker units also desirably each comprise a wireless speaker unit receiver, one such speaker unit receiver being indicated at 56 in FIG. 1 for receiving audio information signals, and a speaker unit speaker, one such speaker unit speaker being indicated at 58 in FIG. 1 for broadcasting audio corresponding to the audio information received by the speaker unit receiver to students in the vicinity of the speaker unit. It should be noted that a classroom may be equipped with other speakers that lack transmitters, but such other speakers even if present would not be deemed a speaker unit. In a classroom setting, desirably at least a plurality of speaker units are located in the same room.

A base unit or base station 60 is shown in FIG. 1 positioned on a table 61, such as near a central location in the room 12. The base station 60 can be loosely resting on the table, although less desirably it can be fastened in place. The base station can be wall mounted or otherwise positioned for receiving and transmitting audio information along audio links or pathways to the various components of the system. The illustrated base station 60 comprises a wireless base station receiver such as indicated by the number 62 and a wireless base station transmitter such as indicated by the number 64. In a typical system, more than one wireless receiver and wireless transmitter can be included in the base unit. Audio signals from the speaker unit transmitters, such as speaker unit transmitter 54, in response to control signals, flow along an audio pathway or audio link from speaker unit transmitter 54 to the base unit receiver 62 and from the base unit transmitter 64 to other wireless receivers in the system. There also can be a plurality of base stations in a room, such as a large room with examples of such plural base station distributed audio systems described below in connection with FIGS. 17 through 31.

FIG. 1 illustrates two instructors 70, 72 in the room 12 with instructor 70 being designated a teacher and instructor 72 being designated an assistant. The teacher 70 is equipped with an instructor unit indicated generally at 76. The instructor unit 76 can comprise an instructor unit speaker, one being schematically shown by the block 77 in FIG. 1, such as an ear bud speaker mounted to a headset for insertion into a teacher's ear. The instructor unit also desirably comprises an instructor unit microphone, such as shown schematically by the block 78 in FIG. 1. The speaker unit microphone can comprise a pendant supported microphone, be clipped or otherwise coupled to the teacher's clothing, be supported by a boom portion of the headset, or otherwise positioned to pick up (detect) audio from the instructor. In addition, the instructor unit can comprise a base portion 80 that, for example, can be worn on the instructor's belt as a belt pack or otherwise. The base portion 80 desirably comprises a housing with a wireless instructor unit receiver 82 and a wireless instructor unit transmitter 84. In the same manner, the teacher's assistant, can have an instructor unit 86, with an instructor unit microphone (shown schematically by block 87) and an instructor unit speaker (shown schematically by block 88) and a base portion 90 with an instructor unit transmitter 92, and an instructor unit receiver 94.

Audio information signals at transmitter 64 of base station 60, corresponding for example to audio detected by a microphone at one of the speaker units, such as by the microphone 52 of speaker unit 40 can be transmitted from base unit transmitter 64 to instructor unit receiver 82 for passage to the instructor unit speaker 77 so as to be presented as audio to the instructor. Alternatively, in response to control signals, audio from the instructor detected by the instructor microphone 78 of instructor unit 76 can be passed as audio information signals from instructor unit transmitter 84 to base unit receiver 64 and via base unit transmitter 62 to a receiver at one or more of the speaker units, such as receiver 54 of speaker unit 40, for delivery to the microphone of the speaker unit 40.

It should be noted that the respective transmitters and receivers can be discreet components and/or can comprise transceivers acting respectively as receivers for the receipt of audio data and transmitters for the transmission of audio data. More specifically and more desirably, the transmitters and receivers do comprise respective transceivers.

Thus, audio pathways or audio links exist for the delivery of audio detected by microphones at one or more of the speaker units via the speaker unit transmitter, base station receiver, base station transmitter, instructor unit receiver, and instructor unit speaker to the instructor and from the instructor unit microphone to the instructor unit transmitter, base station receiver, base station transmitter, the speaker unit receiver and speaker unit speaker to individuals in the vicinity of one or more of the speaker unit speakers.

Desirably the speakers have a localized range such as being operable to deliver audio at a level in the range of about 60 dB to about 80 dB at a distance of about four feet from the speaker. Although cone speakers can be used, or desirably balanced mode radiator speakers or distributed mode speakers are used at the speaker units to provide a relatively flat profile so that the sound passes outwardly from the speakers as opposed upwardly. One exemplary speaker unit speaker is a model BMR AUBA 05809-0001 speaker from Hiwave (formerly NXT). In addition to the audio pathways from speaker units to instructors and from instructors to speaker units, additional audio pathways are also desirably available with this exemplary system. Desirably audio pathways or audio links also exist between the various speaker units and also between the teacher and assistant. In addition, embodiments of the exemplary system can also provide audio pathways or audio links to auxiliary devices, such as projectors, televisions, computers and other audio source devices.

The functional elements of one desirable embodiment of a DAS system can therefore comprise a central base station unit 60, plural speaker units or pods, such as two to six such speaker units, and one or two instruction units. These units operate in response to control signals to selectively open audio links to control the transmission of audio to and from the components of the system. Remote controls, typically one matched to each instructor unit, can be used to provide control signals that control the routing of audio signals between the various system components. The various functional elements of the system can be wirelessly linked using, for example, DECT and/or RF4CE technology. The RF4CE technology is desirably based on the Zybee IEEE 802.15.4 standard. The DECT (Digital Enhanced Cordless Communications Technology) is a digital communication standard (e.g. DECT 6.01.96 Hz or PWT (personal wireless communications)). Alternatively, other wireless communications technologies can be used.

The speaker units facilitate the fundamental principles of the small group instruction methodology and are desirably the central instrument within each of the student groups. Each speaker unit, desirably in one embodiment, comprises a DECT transceiver, a speaker, and environmental microphone. The teacher uses the speaker unit to address and monitor a particular group of students from a remote location using instructor unit, such as a headset microphone and matching RF4CE remote control. The DAS system can also support the traditional classroom amplification applications which comprises up 25% to 50% of the total classroom session. In such cases, simultaneous links to all speaker pods (e.g. up to 6 speaker pods) allows the teacher to address the entire class as a whole. The microphone in the speaker pods can also enable the selected student group to address the whole class in a similar fashion.

Using DECT terminology, the base station unit can be considered as the fixed-part (FP), or base station, for the DECT wireless links. In addition, in this terminology, the speaker pods and the instructor units represent the portable-parts (PP). Since the base station is the FP of the DECT links, the base station is placed within a classroom in order to properly establish the RF connections to the various PP devices. Desirably the speaker units and base stations are portable. Although these units can be detachably or permanently mounted to a table or other support, more desirably they are loose so that the can easily be moved.

FIG. 1 depicts a typical system deployment of the DAS. In addition, other example of use cases will be described below. The major features of an exemplary system embodiment comprise plural speaker pods or units, for example, up to six speaker pods, at least one base unit and at least one instructor unit. These components in one desirable embodiment comprise the following features and/or components:

Speaker Unit.
Integrated Speaker.
DECT PP transceiver supporting wide band (for example, 7 kHz) audio links.
Battery powered for portability.
Integrated battery charger.
Environmental microphone for bidirectional communications with teacher.
Sized for portability.
Base Station or Base Unit.
Provides DECT based station functionality (FP Transceiver). The base station can also comprise a speaker unit and/or an instructor unit, as less desirable embodiments.
Provides a charging station for speaker units, belt packs and remote controls.
Capable of establishing plural wideband DECT audio links, such as eight such links.
Optional auxiliary audio inputs that can be used, for example, to address all of the speaker units in the entire classroom simultaneously.
Instructor Units.
One or more, such as two, instructor units desirably each comprising:
Microphone and speaker (such as head set with ear piece speaker and boom microphone).
Base portion coupled to the speaker and microphone, that can be in the form of a belt pack, lanyard carried, in a pocket, or otherwise.
Can have auxiliary audio input jacks for multimedia and/or other audio source inputs.
DECT PP transceiver supporting wideband audio links.
Portable.
Remote control [Which can be considered as part of an instructor unit and/or separately, button or other data entry such as a push user interface for control of communication links and thus DAS system parameters. The remote control can be matched to an associated instructor unit (such as the case in universal remote technology wherein the remote is matched to control a particular device)]. A matching RF4CE remote control unit can be used for each instructor unit.
Battery charger integrated into each remote control and each base portion.

Also, local microphone muting and volume control can be provided at each of the speaker units and instructor units.

Figure 2:
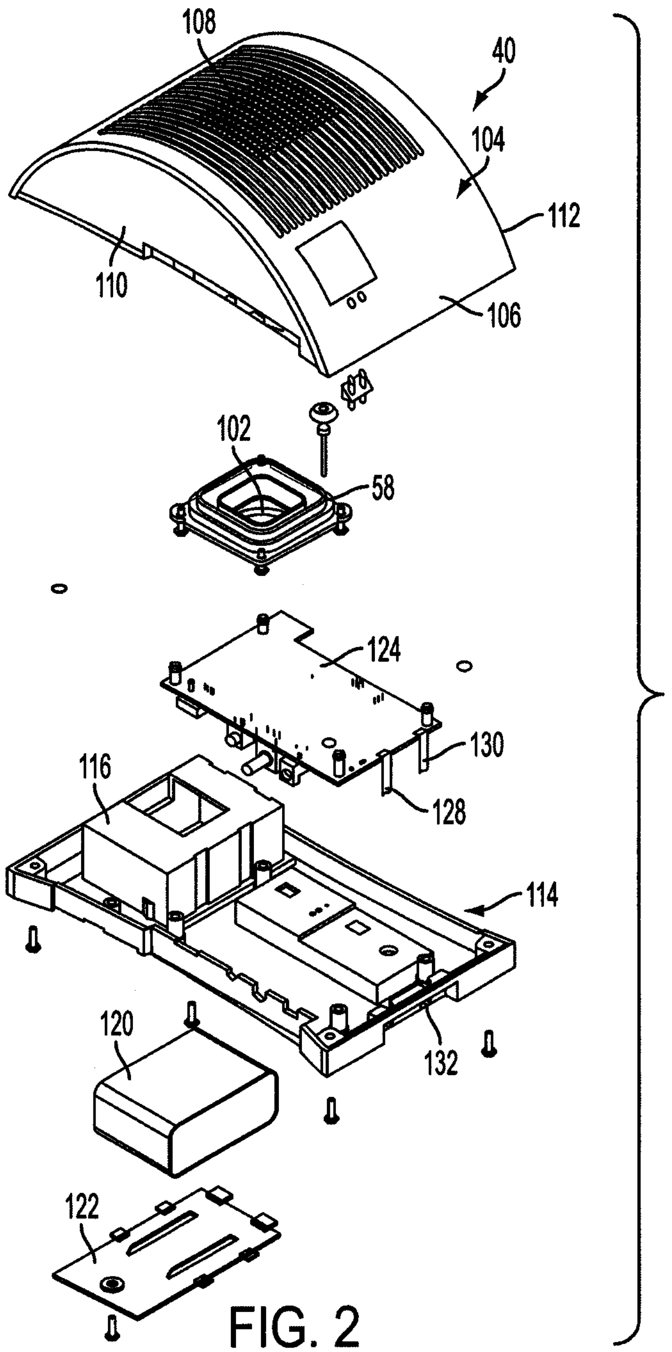
FIG. 2 illustrates an exploded view of an exemplary speaker unit.

With reference to FIGS. 2, 3A, 3B, and 4, an exemplary speaker unit, such as speaker unit 40 will be described. The illustrated speaker unit comprises a speaker 58 with a sound emitter portion 102 directed upwardly toward an upper surface 106 of an upper speaker housing section 104. A grid 108 is provided in housing section 104 with openings through which sound can be emitted or broadcast from the speaker. The illustrated surface 106 can be of any suitable shape, such as an aesthetically pleasing generally right cylindrical surface. Housing section 106 also comprises respective first and second side wall portions 110, 112. A base or bottom housing section 114 also is included in the housing as shown in FIG. 2. Housing base portion 114 defines a battery pack receiving compartment 116 for receiving a rechargeable battery pack 120. A cover 122 is provided to close the housing and to hold the battery pack in place. A circuit board 124 is also included in the speaker unit to support the respective transmitter/receiver components and a conventional charging circuit for the charging the battery pack 120. First and second electrical charging contacts 128, 130 are shown coupled to the circuit board 124 and to the charging circuit. These electrical charging contacts extend to the exterior of the speaker unit housing and are positioned in a recess 132 defined in the lower section 114 of the speaker housing. It should be noted that rechargeable batteries and battery packs are desirable for use in the components of systems disclosed herein, but that disposable batteries can alternatively be used.

Figure 3A:
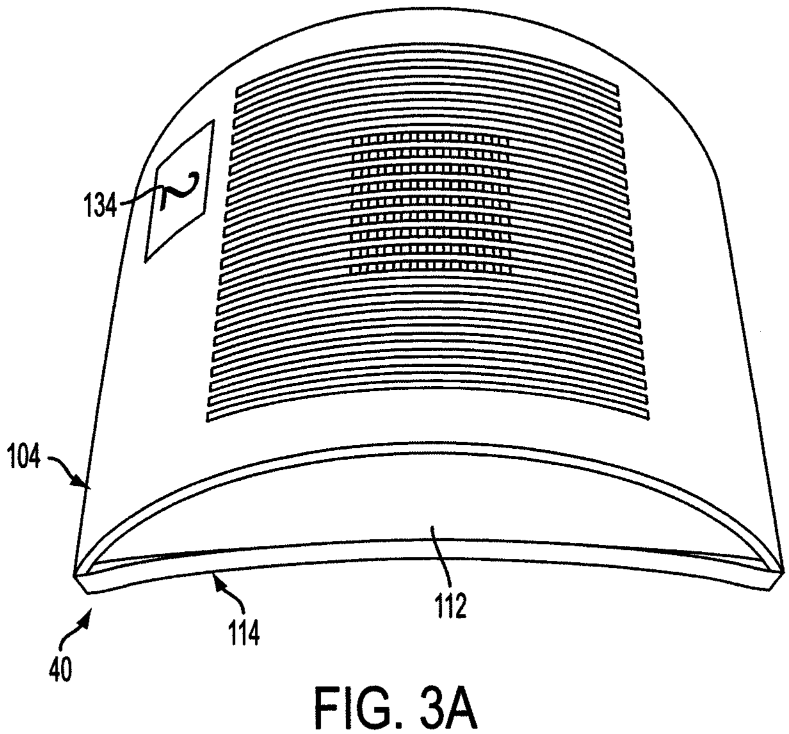
FIG. 3A illustrates a top of an exemplary speaker unit looking downwardly toward one side of the speaker unit.

As best seen in FIG. 3A, visual indicia, such as indicated by the number 134 pointing to an Arabic number 2 on the illustrated speaker unit, is desirably provided to identify the particular speaker unit. Corresponding identifiers on a remote control facilitate an instructor's control of the system to route audio signals to the desired components in that the instructor can readily identify which speaker unit is being controlled by a particular control input of a remote control.

Figure 3B:
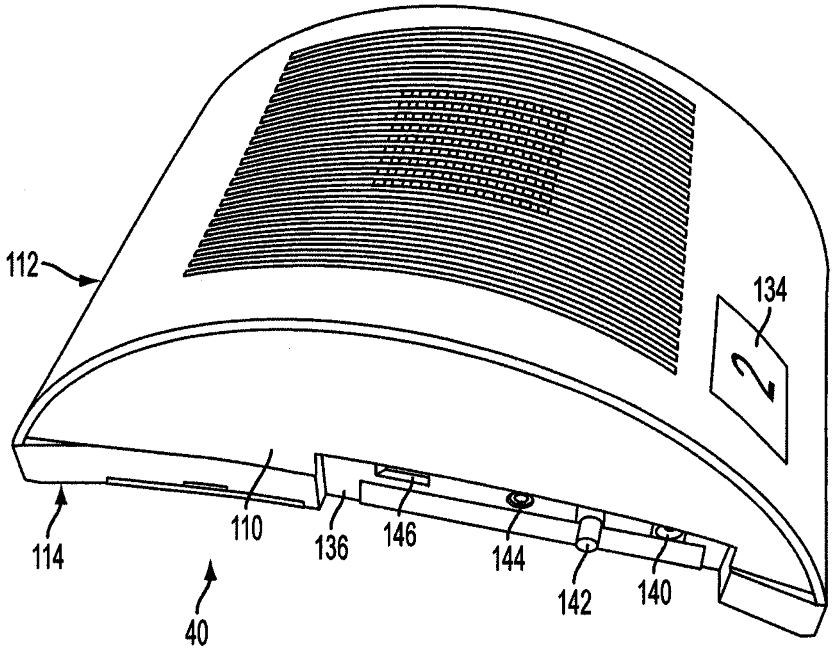
FIG. 3B illustrates another view of an exemplary speaker unit 40 looking downwardly toward the opposite side from the side shown FIG. 3A.

FIG. 3B illustrates another view of an exemplary speaker unit 40 looking toward the wall 110 and showing a recessed area 136 along the side of the housing for the speaker unit. Various inputs and outputs can be located in this recessed area. For example, a battery pack DC charging input 140 can be included. A local volume control 142, such as a knob, is provided at the speaker unit to allow localized control of the volume of an assisted listening device plugged into an assisted listening device output 144 (ALD OUT) of the speaker unit. A headset or other assisted listening device jack or connector can be coupled to the ALD OUT to provide audio to someone who experiences difficulty in hearing. An auxiliary output 146, which can for example comprise a USB port, is also indicated in FIG. 3B. A wireless communicator, such as a blue tooth device, can be coupled to the auxiliary output to provide audio to a blue tooth enabled headset or other receiver. Other auxiliary devices can also be coupled to the auxiliary output for receiving and using audio signals passing to and from the speaker unit. Desirably, a volume control for the audio volume for the speaker of the speaker unit, if provided at the speaker unit is hidden or made difficult to operate (e.g. requires a hand tool). Consequently, students in this embodiment would not be able to easily adjust the volume of the speaker delivered audio output, leaving such control to the instructor, such as via a remote control as explained below.

Figure 4:
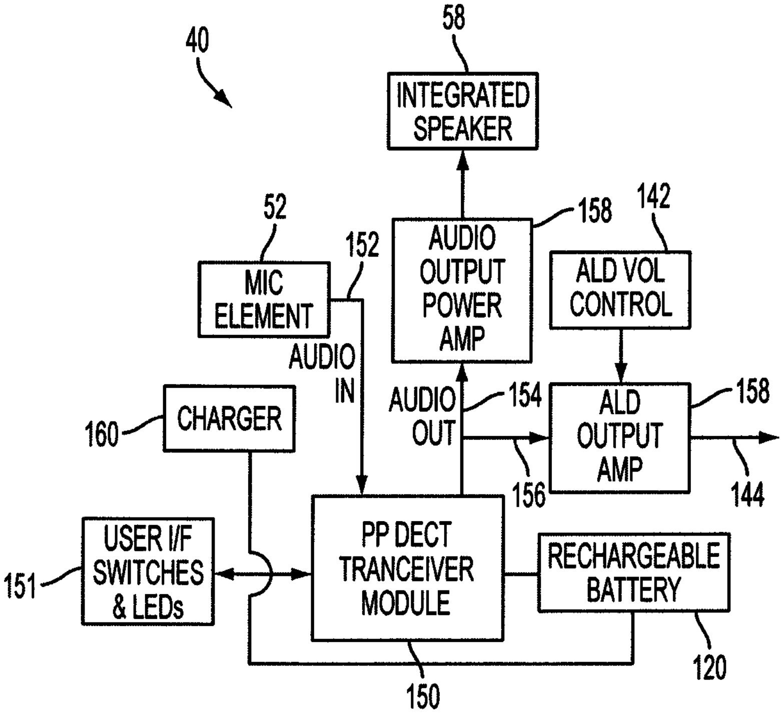
FIG. 4 illustrates an exemplary speaker unit circuit architecture.

FIG. 4 illustrates an exemplary architecture for the circuits comprising the speaker units, such as speaker unit 40. In FIG. 4, the transmitter 54 and the receiver 56 (FIG. 1) of the speaker unit are combined into a transceiver module 150, implementing, in this example, DECT technology. A speaker unit microphone 52 is shown coupled by a line 152 to an audio in input of module 150. An audio out output from module 150 is shown being delivered via line 154 to an audio output amplifier 158 and to the speaker 58 for broadcast to students in the vicinity of the speaker unit. A portion of the audio output from line 154 is shown being delivered via line 156 to an assisted listening device output amplifier 158 and to the ALD Out jack 144 of the speaker unit. The ALD volume control 142 is also shown in FIG. 4. The battery pack 120 is shown in FIG. 4 coupled to a battery charger 160 that can receive power via the power input 140 (FIG. 3B) or via the charging contacts 128 and 130 (FIG. 2) when the charging contacts engage charging contacts of a power supply device. Various user interface switches and indicators, such as LED indicator lights, indicated generally by the number 151 in FIG. 4, can be provided to facilitate the operation of the speaker units. For example, indicator lights can be provided to visually indicate whether the speaker unit is on, whether the instructor is listening in on conversations in the vicinity of the speaker unit, and other functional states. Exemplary indicators of one embodiment are described below.

Speaker Pod Exemplary Controls:

Power Switch: Can use a two-position slide switch that disconnects the DC power supply. The switch is desirably positioned to be recessed on the bottom of the speaker unit housing so it will not be easily accessed or inadvertently turned off.

Speaker Volume: Can use a rotary control of speaker output volume.

The knob can be positioned to be recessed on the bottom of the speaker unit housing so that it cannot be accessed without a simple tool.

ALD Volume: Can use rotary or other control of ALD audio output volume. The control desirably is prominently positioned close to an ALD output jack (e.g. 3.5 mm jack).

Pod Registration: Can use push-button to initiate pod side of registering with the base station. The pod registering button can be positioned so that it cannot be accessed without a simple tool. The button can be mounted adjacent to or next to a Pod Registration LED.

Exemplary Speaker Unit Indicators:

Pod ID: Can use stickers, other indicators and/or LED display such as a red 7-Segment Display. Can be conveniently mounted, such as on the front panel.

Pod Charge LED: Can be Red/Green LED. Can be front panel mounted.

- LED steady red can indicate charge in progress.
- LED flashing red can indicate fault such as no battery pack detected.
- LED steady green can indicate charge complete and trickle charge in progress while DC power supply still connected
- LED steady off can indicate no charging.

Pod Registration

LED: Can use one yellow LED. The LED can be mounted adjacent to or next to Pod Registration button.

- Slow flashing yellow can indicate registration process in progress.
- Steady yellow for 30 seconds can indicate registration process completed successfully.
- Fast flashing yellow can indicate that the registration process failed.
- LED steady off can indicate no registration process ongoing.

Pod Link LED: Can use one green LED located next to the Pod Registration LED.

- Steady green can indicate DECT RF link is established with the base station.
- LED steady off can indicate no DECT RF link is established with the base station.

Power LED: Can use one blue/red LED to indicate power on.

- Steady blue can indicate power switch in ON position and batteries charged.
- Steady red can indicate low battery indication.
- LED steady off can indicate unit is not powered.

Figure 5:
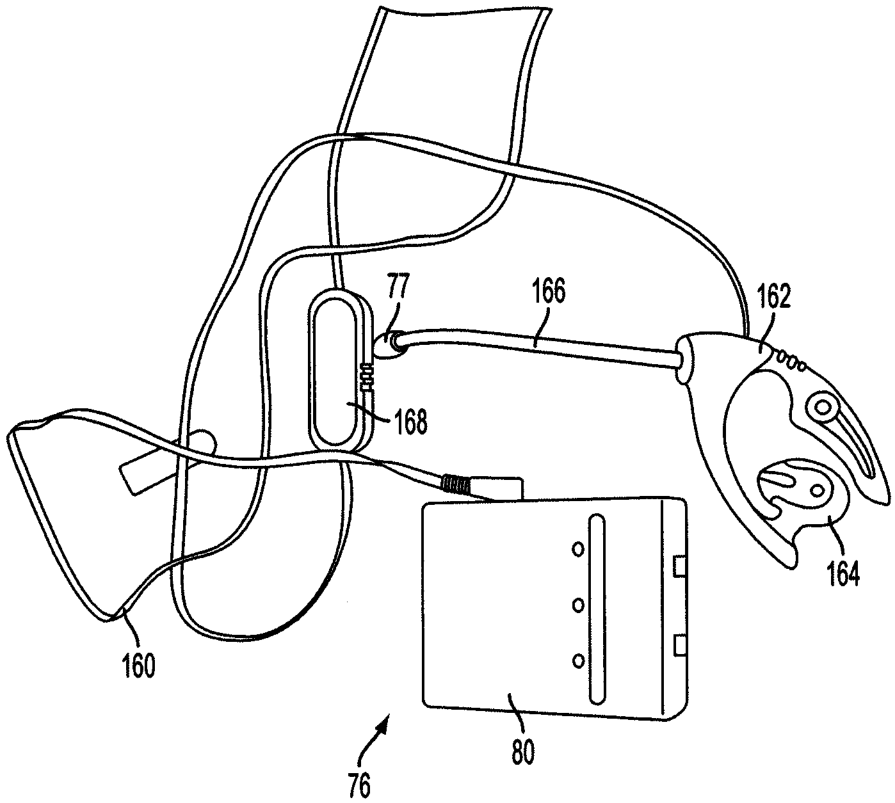
FIG. 5 illustrates an exemplary form of instructor unit with a headset.

FIG. 5 illustrates an exemplary form of instructor unit 76 that is a headset type unit. In FIG. 5, the base portion 80 of the headset is shown connected by cables 160 to the headset unit 162. An ear bud type speaker 164 is coupled to the headset 162, and more specifically supported by the headset, for positioning in the instructor's ear. A microphone boom 166 is shown connected to the headset with a microphone 77 shown supported by the boom. The microphone 77 in this example would be positioned nearer to the instructor's mouth when the head set is worn to facilitate picking up of audio from the instructor. A data controller 168 can be inserted in cable 160 to provide for various functions such as muting the microphone and/or speaker.

Figure 6:
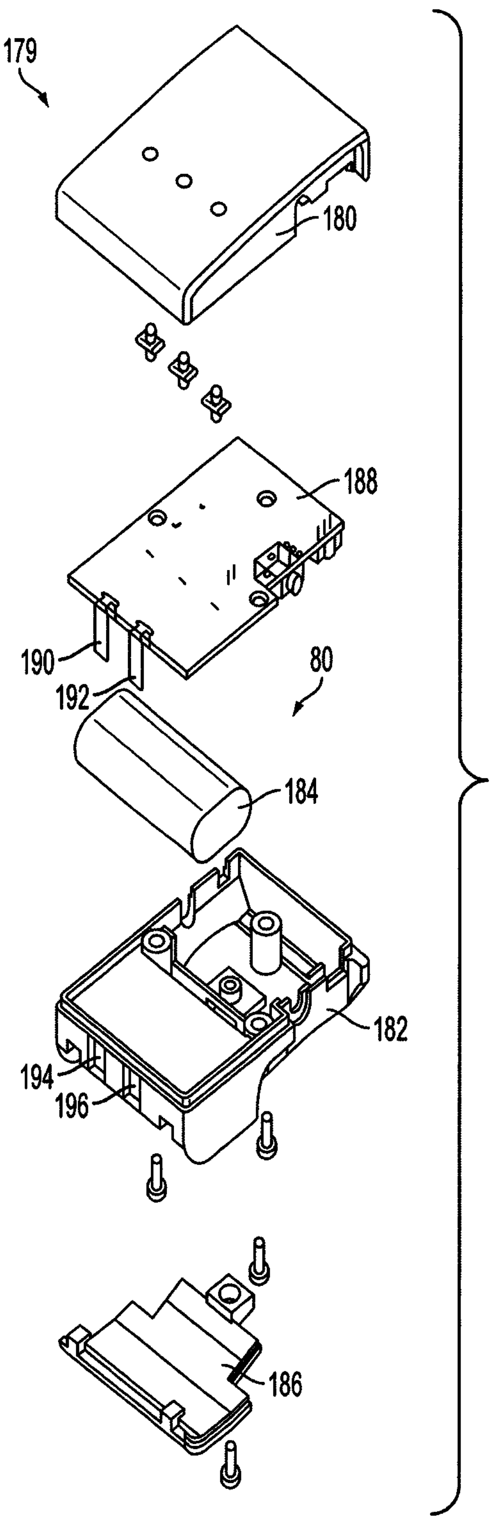
FIG. 6 illustrates an exploded view of an exemplary base portion of the instructor unit.

FIG. 6 illustrates an exploded view of an exemplary instructor unit base portion 80. As can be seen in FIG. 6, a base portion housing 179 comprises upper and lower housing sections 180, 182, with the lower housing section defining a battery receiving compartment for receiving a rechargeable battery 184. A battery compartment cover 186 is shown in this figure together with a circuit board 188 for supporting the circuitry contained in the base portion housing 179. The circuitry desirably comprises a battery charging circuit coupled to charging contacts 190, 192 and an audio transmitter and receiver. The respective charging contacts 190, 192 are positioned within respective recesses 194, 196 of the housing section 182 where they are exposed for engaging electrical charging contacts of a battery charger to recharge the battery 184.

Figure 7:
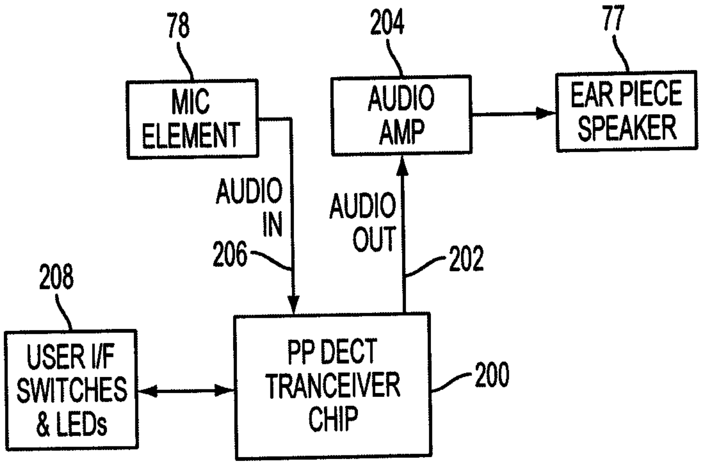
FIG. 7 illustrates an exemplary instructor unit circuit architecture.

With reference to FIG. 7, an exemplary architecture of one embodiment of an instructor unit is illustrated. In FIG. 7, the instructor unit transmitter and instructor unit receiver are illustrated as a transceiver chip 200 implementing DECT technology. Audio is transmitted from chip 200 via a line 202 to an audio amplifier 204 and then the instructor unit speaker 77. The audio in line 202 corresponds to audio detected (picked up) by one or more of the speaker unit microphones and/or another instructor unit microphone, for example. Audio detected by the microphone 78, for example when the instructor is providing instructions, is delivered via a line 206 to the chip 200 for routing the response to control signals to one or more of the speaker units and/or another instructor unit. In addition, the system is not limited to a single base unit system and hence audio pathways or links can be provided to other base units and speaker units affiliated or associated with other base units as well. Block 208 indicates user interface switches and indicators such as LED indicators to provide visual indications to the instructor of the status of the instructor unit. Exemplary indicators for one embodiment are discussed below.

Belt-Pack Exemplary Controls:

Power Switch: Can use two-position slide switch to disconnect DC power supply. Switch can be positioned or otherwise controlled so as to prevent inadvertent shutoff.

Belt-Pack

Registration: Can use push-button to initiate the belt-pack side of registering with the base station. The registration button can be positioned or otherwise controlled so as to prevent inadvertent activation.

Exemplary Belt Pack Indicators:

Teacher-A (Dominant Instructor)

Belt-Pack LED: Can use one blue LED

- Steady blue can indicate belt-pack is linked to the base station as a “Teacher-A” belt-pack.
- Can flash alternately with Teacher-B Belt-Pack LED during registration process.
- Can flash synchronously with Teacher-B Belt-Pack LED if registration fails.
- Can use steady red for a low battery condition.

Teacher-B (Assistant Instructor)

Belt-Pack LED: Can use one blue LED

- Steady blue can indicate belt-pack is linked to the base station as a “Teacher-A” belt-pack.
- Can flash alternately with Teacher-A Belt-Pack LED during registration process.
- Can flash synchronously with Teacher-A Belt-Pack LED if registration fails.
- Can use steady red for a low battery condition.

Power and Low

Battery LED: Teacher-A Belt-Pack LED and/or Teacher-A Belt-Pack LED (described above) can be used as the power and low battery indicator.

Belt-Pack

Charge LED: Can use Red/Green LED.

- Steady red can indicate charge in progress.
- LED steady green can indicate charge complete while DC power supply still connected.
- LED steady off can indicate no charging if DC power disconnected.

Figure 8:
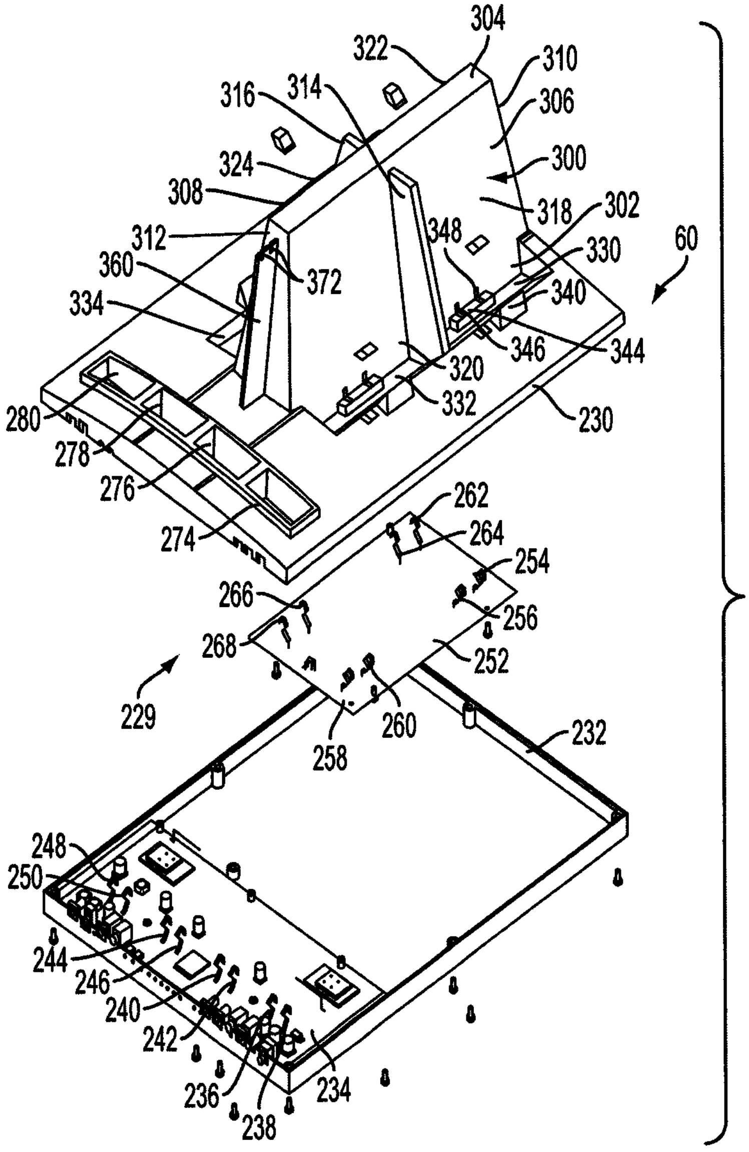
FIG. 8 illustrates an exemplary base unit embodiment for a four speaker unit system.

FIG. 8 illustrates an exemplary base unit 60 in the form of an embodiment that is desirable for a four speaker unit system. This unit can be expanded to more speaker units or fewer speaker units by changing the number of speaker unit docking stations. In the embodiment of FIG. 8, the base station 60 comprises a housing 229 including upper and lower housing sections 230, 232. When assembled, the lower portion of housing section 230 and the housing section 232 comprise a support platform portion of the base unit housing 229. A circuit board 234 is shown installed in the base unit 232 and contains the circuit components used in the base unit. The circuit board can comprise a battery charger and is provided with a plurality of sets of charging contacts. The sets of charging contacts comprise first and second electrical charging contacts 236, 238 for use, for example, in charging the battery of a speaker unit base portion, a second set of charging contacts 240, 242 for use, for example, in charging the battery of a remote control, another set of electrical charging contacts 244, 246 for use, for example, in charging a second remote control if included in the system, and battery charging electrical contacts 248, 250 for use, for example, in charging the battery of another instructor unit if included in the system. Another circuit board 252 is shown in FIG. 8. The circuit board 252 comprises a plurality of sets of speaker unit charging electrical contacts including a first set comprised of electrical contacts 254, 256, a second set comprised of electrical contacts 258, 260, a third set of electrical contacts comprised of contacts 262,264 and a fourth set comprised of electrical charging contacts 266, 268.

As can be seen in the upper section 230 of the embodiment of the base unit housing 229 shown in FIG. 8, a plurality of pockets or receptacles 274, 276, 278, and 280 are shown adjacent to one end portion of the housing section 230. These pockets are configured to receive respective instructor unit base portions and remote controllers, which can be of the same or different shapes. If the shapes and positioning of charging contacts of various devices match the shapes and contact positions of the receptacles, the receptacles can be used interchangeably for the different devices. The contacts 236, 238 desirably project upwardly into the base of receptacle 274, the contacts 240, 242 desirably project upwardly into the base of receptacle 276, the contacts 244, 246 desirably project upwardly into the base of receptacle 278 and the contacts 248, 250 desirably project upwardly to the base of receptacle 280. Consequently, when instructor unit base portions or remote controllers are placed in respective receptacles, charging contacts of such components engage the contacts of the base portions to complete electrical charging circuits to charge the respectively received remote controls and instructor unit base portion devices. Thus for example, the contacts 190, 192 (FIG. 6) of the instructor base portion shown in FIG. 6 would engage the contacts 236, 238 if the base portion 80 of FIG. 6 is positioned in receptacle 274. A remote control as discussed below can have similar charging contacts.

The upper base unit section 230 in FIG. 8 also desirably comprises an upwardly projecting speaker supporting portion 300 having a base 302 adjacent to the platform portion of the housing and a distal end 304 spaced from the platform portion. The projection 300 can comprise first and second major walls 306, 308 and end walls 310, 312. As can be seen in FIG. 8, in vertical section taken along a plane parallel to walls 310, 312, the projection can be substantially trapezoidal in this vertical section. The walls 306, 308 in this illustrated embodiment desirably each comprise at least a respective wall surface portion that is inclined relative to vertical with these inclined wall surface portions converging toward one another moving in a direction away from base 302 and toward distal end 304. In addition, the major walls 306, 308 can be subdivided or separated by respective upright dividers 314, 316. As a result, respective speaker supporting surfaces 318, 320 are provided along a portion of wall 306 and similar speaker unit supporting surfaces 322, 324 are provided along wall 308. A respective speaker receiving pocket is provided at the base of each of these wall sections 318, 320, 322, and 324 with three of these pockets being indicated by the numbers 330, 332 and 334 in FIG. 8. The pocket at the base of wall section 322 in FIG. 8 is not visible in this figure.

A speaker retaining projection is desirably provided adjacent to the outer edge of each pocket in a position spaced transversely outwardly from the associated wall. One such retainer 340 is shown numbered in FIG. 8 in a positioned spaced across the receptacle and opposing the wall section 318. In addition, respective electrical contact supporting or protecting members, each defining respective electrical contact receiving slots, can be included at the base of each of the wall sections. One such contact support 344 is shown in FIG. 8 with respective electrical contact slots 346, 348 being provided for receiving the electrical contacts 254, 256 when the base unit is assembled. The contacts 254, 256 are exposed through the respective slots 346, 348 and are positioned to engage corresponding electrical charging contacts of a speaker unit when the speaker unit is positioned in the associated speaker receiving pocket, for example pocket 302. Thus, when speaker unit 40 of FIG. 2 is inserted into pocket 330, the electrical contacts 128, 130 of the speaker unit 40 are placed in contact with the contacts 346, 348 of the base unit to couple the speaker unit to a charging circuit for charging of the battery pack 120 (FIG. 2) of the speaker unit via the engaged electrical contacts.

The wall 312 can also be provided with a projecting flange or support 360 on which, for example, cables of the instructor units can be suspended. Cable receiving notches 372 can be provided at the upper edge of projection 360 for this purpose.

Figure 9:
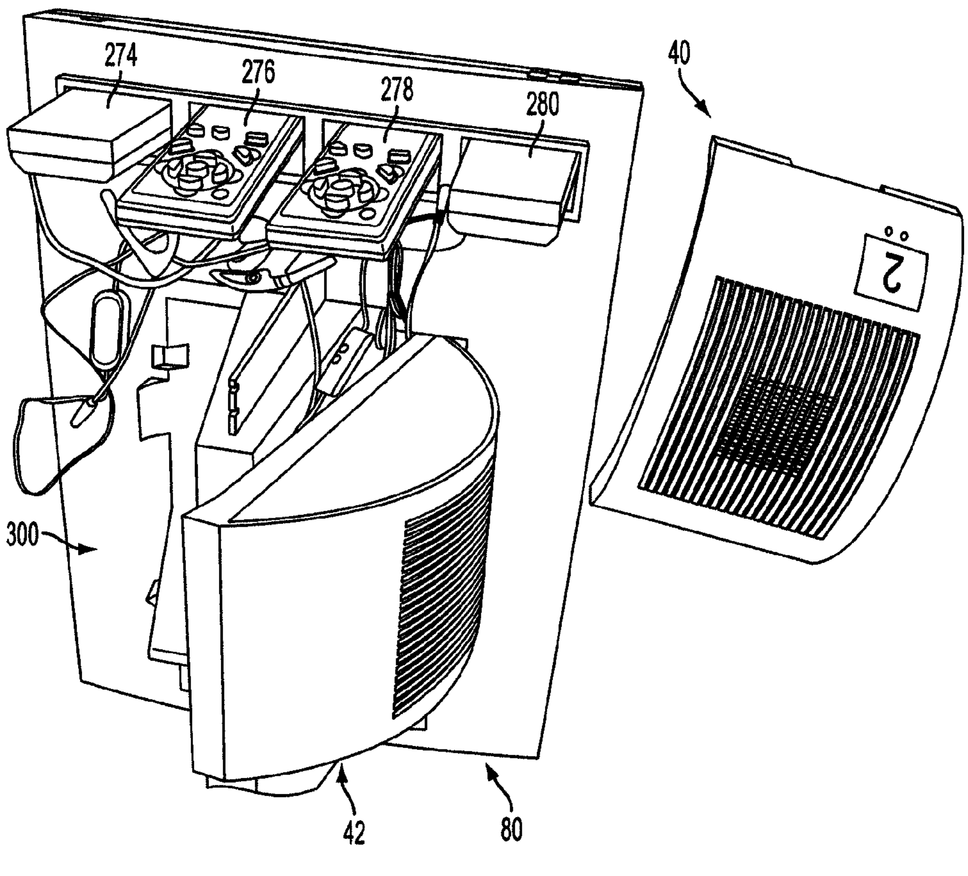
FIG. 9 illustrates a two speaker embodiment of a base station with one speaker unit shown removed from the base station housing and a second speaker unit shown with an undersurface leaning against a support wall portion of the illustrated base unit housing.
Figure 10:
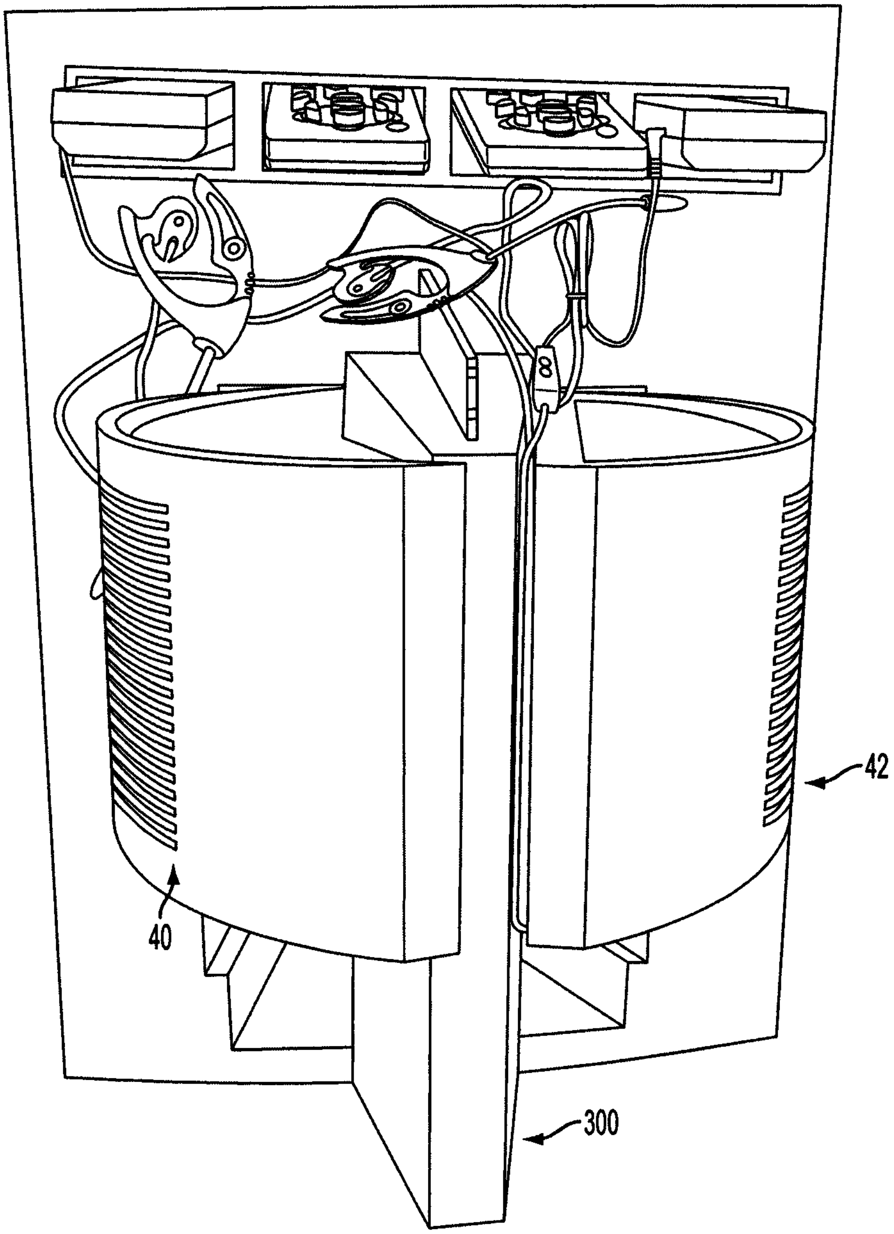
FIG. 10 is similar to FIG. 9 except that both speakers units have been positioned on the base station.

FIG. 9 illustrates a two speaker embodiment of a base station 80 with a first speaker unit 40 shown removed from the base station housing and a second speaker unit 42 shown with an undersurface leaning against a support wall of the upwardly projecting speaker support portion of the illustrated base unit housing. FIG. 9 also illustrates two remote controls in the respective receptacles 276, 278 and two instructor unit base portions in the respective receptacles 274, 280. FIG. 10 is similar to FIG. 9 except that both speakers 40, 42 have been positioned in their respective receptacles with the undersurface of the respective speaker units leaning against the inclined major walls of the projection 300. Desirably the speaker units and speaker unit receptacles are all or the same shape so that any speaker unit can be positioned in any receptacle for storage when stowed.

Figure 11:
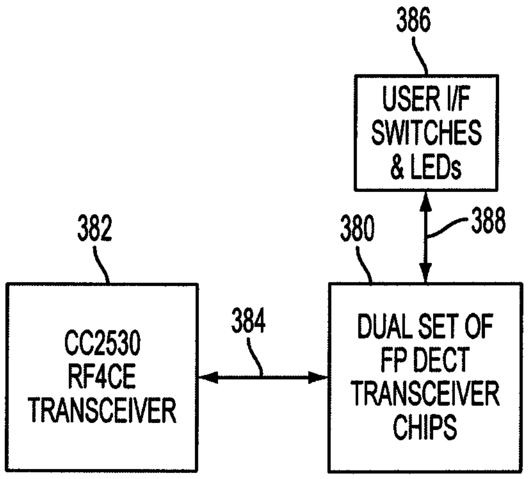
FIG. 11 illustrates an exemplary circuit for one embodiment of a base unit.

FIG. 11 illustrates an exemplary circuit configuration for one embodiment of a base unit. The illustrated embodiment comprises a first set of two transceiver chips 380 that, in this embodiment, implement DECT technology for routing audio signals between the various components in response to control signals. Thus, the transceiver chips perform the function of the base unit receiver and transmitter. In addition, a control signal transceiver is also indicated at 382 in communication via line 384 with the chips 380 for receiving control signals from a remote control to control the routing of audio information through the base unit in response to the control signals. User interface switches and indicators, such as LEDs are shown by block 386 in communication, via line 388, with the transceivers 380 to provide status information concerning the base unit and data flow there through. Exemplary indicators for one embodiment of a base unit are described below.

A dual set of DECT chips in this embodiment can have the capacity to establish the desired number of audio links, such as eight simultaneous wide band DECT audio links (for example, 4-links per FP DECT transceiver). In addition, although not shown in FIG. 11, the base unit can have one or more auxiliary audio inputs to which devices can be attached (such as projector audio and the like) for broadcasting audio for addressing the entire group with audio.

Base Station Exemplary Controls

Power Switch: Two-position slide switch can be used to disconnect DC power supply to the base station circuitry, but desirably not to the external chargers. The switch can be positioned so as not to be too prominent.

RF Transmit Power: Two-position slide switch can be used to select between normal or high transmission levels. The switch can be positioned so it desirably cannot be accessed without a simple tool.

Speaker Pod Registration: Push-button to initiate base station side of registering a new pod device. The button is desirably positioned so that it cannot be accessed without a simple tool. This input device can be mounted to a rear panel of the base system adjacent to or next to a Speaker Pod Registration LED.

Belt-Pack (Instruction Base Portion)

Registration: Push-button to initiate base station side of registering a new belt-pack device. The button is desirably positioned so that it can not be accessed without a simple tool. This input device can be mounted to a rear panel of the base station adjacent to or next to a Belt-Pack Registration LED.

RF4CE Remote

Unit Pairing: Push-button to initiate base station side of pairing a new RF4CE remote control device. The button is desirably positioned so that it can not be accessed without a simple tool. This input device can be mounted to a rear panel of the base station adjacent to or next to an RF4CE Remote Unit Pairing LED.

Base Station Exemplary Instructions:

Pod Registration

LED: Can use one yellow LED near pod registration push button. Can be rear panel mounted adjacent to or next to Pod Registration button.

Slow flashing yellow can indicate registration process in progress.

Steady yellow for 30 seconds can indicate registration process completed successfully.

Fast flashing yellow can indicate that the registration process failed.

LED steady off can indicate no registration process ongoing.

Pod Link LEDs: Can by four to six green LEDs (desirably one per speaker pod) that can be near the pod registration LED. Each green LED can correspond with one of the speaker pods.

Steady green can indicate DECT RF link is established with the corresponding speaker pod.

LED steady off can indicate no DECT RF link is established with the corresponding speaker pod.

Belt-Pack

Registration LED: Can be one yellow LED that can be adjacent to or near pod registration push button. Can be rear panel mounted adjacent to or next to Pod Registration button.

Slow flashing yellow can indicate registration process in progress.

Steady yellow for 30 seconds can indicate registration process completed successfully.

Fast flashing yellow can indicate that the registration process failed.

LED steady off can indicate no registration process ongoing.

Belt Pack

Link LEDs: Can use two green LEDs (one per instructor unit) adjacent to or near the belt-pack registration LED. Each green LED can correspond with one of the belt-packs.

Steady green can indicate DECT RF link is established with the corresponding belt-pack.

LED steady off can indicate no DECT RF link is established with the corresponding belt pack.

RF4CE Remote

Unit Pairing LED: Can be one yellow LED adjacent to or near remote pairing push button. Can be front panel mounted adjacent to or next to RF4CE Remote Unit pairing button.

Steady yellow can indicate pairing process in progress. LED goes off when pairing is successful.

Flashing yellow can indicate that the pairing process failed.

LED steady off can indicate no pairing process ongoing.

Power LED: Can be one blue power on LED.

Steady blue can indicate DC power supply connected and power switch in the ON position.

As true throughout this disclosure, any suitable control input device can be used, such as touch pads, key pads and the like. Push buttons have proven to be convenient.

Figure 12:
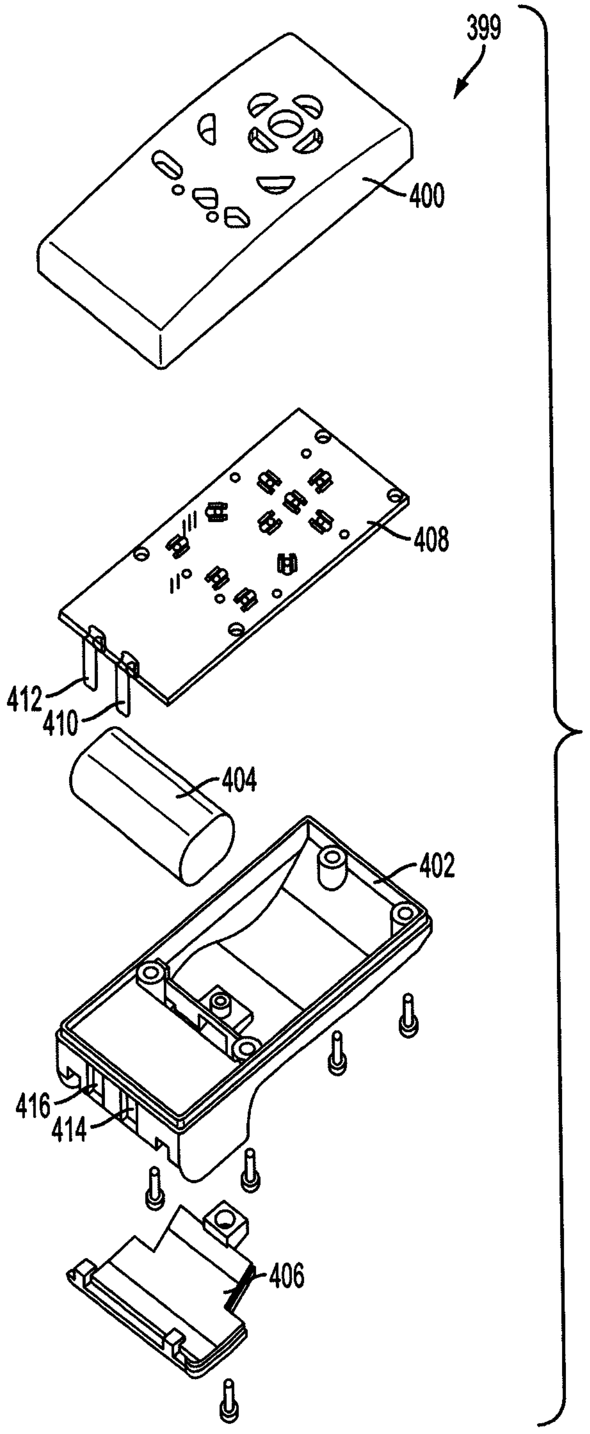
FIG. 12. Illustrates an exploded view of an exemplary remote control with push button input devices removed.

FIG. 12 illustrates an exemplary remote control (with push button input devices removed). The illustrated remote control comprises a remote control housing 399 comprised of upper and lower housing sections 400, 402. The illustrated lower housing section 402 defines a battery receiving compartment for receiving a battery 404. A battery cover 406 is provided to overly and close the battery compartment. A circuit board 408 is also included in the remote control as explained below in connection with FIG. 15. Desirably the remote control comprises charging contacts 410, 412 that are positioned in respective recesses 414, 416 of the lower remote control housing section 402, where they are exposed for engagement by electrical charging contacts of an electrical charger, such as by the electrical charging contacts 240, 242 (FIG. 8) of the base station unit when the remote control is placed in the respective receptacle 276.

Figure 13A:
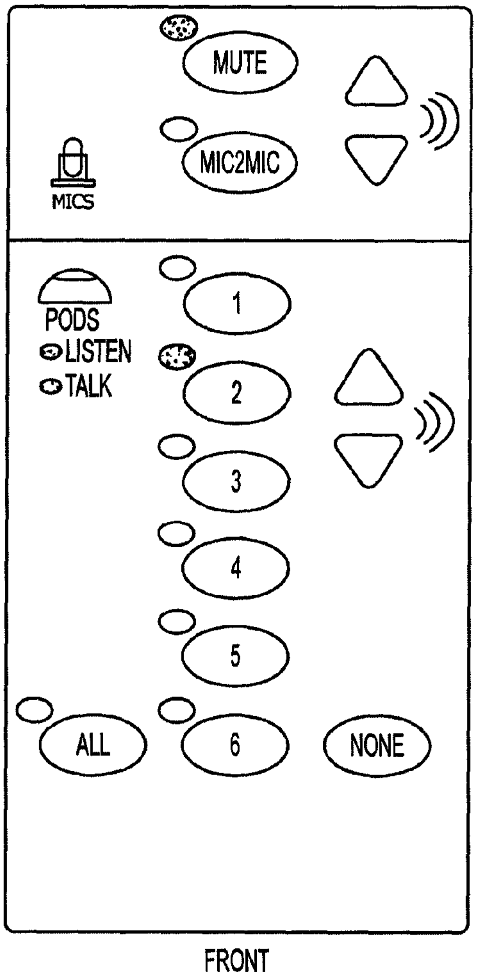
FIGS. 13A and 13B illustrate an exemplary remote control unit for providing control signals to the components of a distributed audio system embodiment.
Figure 13B:
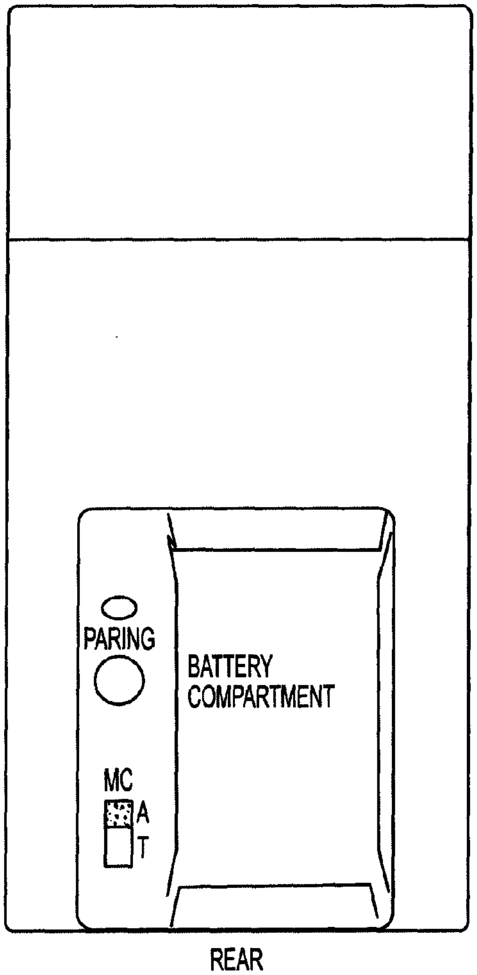
Figure 14:
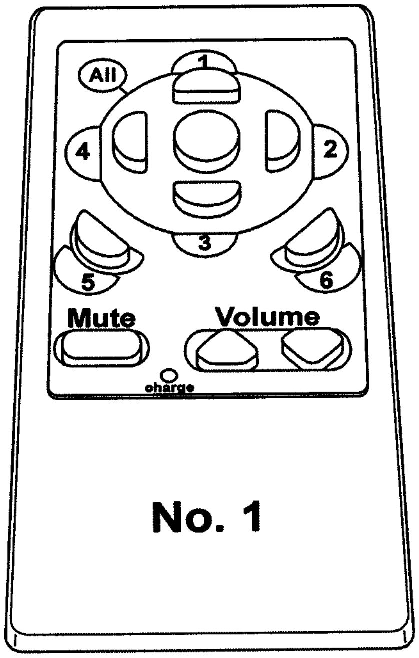
FIG. 14 illustrates an alternative embodiment of a remote control unit.

FIGS. 13A, 13B, and 14 illustrate exemplary remote control units for providing control signals to the components of the distributed audio system. In these embodiments, ten push-button controls are provided together with volume controls on the front of the units. The numbers of the push buttons numbered one through six in FIG. 13A and FIG. 14 each correspond to a respective one of the speaker units in a six unit system. Desirably, any suitable indicia that matches a speaker unit to a control can be used. The number of these speaker unit control buttons can be reduced if fewer speaker pods are included in a system. Thus in this example, the Arabic identification number on each of these push buttons corresponds to an indicator, such as the same Arabic number, on an associated respective speaker pod. The operation of an exemplary remote control is described below with reference to FIGS. 13A and 13B. It is to be understood that the operation of the remote control of FIG. 14 can be the same or substantially the same.

As a specific example, one embodiment of a set of controls and indicators for an exemplary remote control are described below.

Exemplary Remote Rear Panel Controls: (Located in this Embodiment Inside the battery compartment)

"Teacher Select"

Switch: Can be a two-position slide switch selecting either Teacher-A Mode or Teacher-B Mode. One of the belt-packs is designated as Teacher-A and the other as Teacher-B. For the system to operate properly the mode of the RF4CE should match the user's belt-pack designation.

"PAIR" button & LED: Push-button switch to initiate RF4CE pairing process between the base station and the remote control unit.

Exemplary Remote Front Panel Controls:

Belt-Pack Section Controls: (upper section of front panel)

"MUTE" button: When pressed, this causes the muting of the microphone element for the matching headset boom microphone and desirably regardless of what audio links are, or are not, currently established. The "MUTE" button can be lighted red when the headset microphone is muted and can be unlighted all other times.

Pressing "MUTE" again, or pressing "ALL" in this embodiment desirably automatically un-mutes the headset boom microphone. However, the mute mode can, in this embodiment, be re-entered again at any time without changing the audio link state.

Volume Control

Buttons: The increase volume button increases the ear bud speaker volume for the matching belt-pack headset.

The decrease volume button decreases the ear bud speaker volume for the matching belt-pack headset.

Pressing the upper volume control buttons desirably results in a "beep" (or other auditory indicator) heard from the ear bud speaker of the matching belt-pack headset. The volume of the "beep" can be proportional to the selected headset's speaker volume level setting. A quick double "beep" or other auditory indicator can be provided when the min or max volume limits are encountered.

Pod Section Controls: (lower section of front panel)

"1", "2", "3", "4"

"5, and 6": When pressed, these buttons select the corresponding speaker pod. Pressing the numbered pod button can allow the headset microphone to establish a bidirectional audio link to the selected pod if the belt-pack's microphone is not currently in the mute mode (see "MUTE" button above) at which point the numbered pod button can be lighted green. If the belt-pack's microphone is in the mute mode, pressing the numbered pod button can allow the headset microphone to monitor the selected pod unheard. The numbered pod button can then be lighted red.

The pod can be unselected (and unlighted) by pressing any numbered pod button, or by pressing the "ALL" button.

A numbered pod button can allow the selected pod to talk to all pods, for example, if it is pressed immediately after the ALL button (alternatively: if it is pressed and held down for three seconds). In addition to the selected pod, the two teachers' belt-packs can also talk to all pods simultaneously. The microphone elements of the other unselected pods are desirably muted. Both the numbered pod button and the "ALL" button can be lighted green. In this example, the pod can be unselected (and unlighted) by pressing any numbered pod button in this example, or by pressing the "ALL" button.

Both teachers desirably can establish their own link to the same pod at the same time. This sets up a three way conversation between the two teachers and the student group around the pod.

ALL" button: Allows both of the teachers' belt-packs to talk to all pods in this example. During the "ALL" operation, the audio signals applied to the two AUX audio inputs desirably will also be sent to all pods. The microphone elements in the pods are desirably muted. The "ALL" button can be lighted green when the "ALL" operation is active.

Pressing a numbered pod button immediately after the ALL button (alternatively: pressing a numbered pod button and holding it down for three seconds) can allow the selected pod to enter the "ALL" mode and to thus talk to all of the pods. In addition to the selected pod, the two teachers' belt-packs and the AUX audio inputs can also be heard at all pods simultaneously. The microphone elements of the other pods can be muted under these conditions. Both the numbered pod button and the "ALL" button are desirably lighted green in this case.

Exemplary Controls for Remote Control Unit:

Command Key Pad: Eight push-buttons. Front panel mounted.

Belt-Pack "Mute" key.

"Select Pod" keys (e.g. one per Speaker Pod, such as six).

"ALL" key.

Teacher Select: Rear panel mounted, 2-position slide switch to select between Teacher-A and Teacher-B modes.

RF4CE Remote

Unit Pairing: Push-button to initiate the remote's side of the pairing process between a new remote to the base station as well as matching the remote to a belt-pack.

Auto Power Down: The DC power can be disconnected automatically when dropped into the charger. Can also be disconnected in energy conservation mode after a period of inactivity (e.g., two hours).

Exemplary Rear Panel Remote Controls: (Located in this Embodiment Inside the Battery Compartment)

"Teacher Select"

Switch: Can be a two-position slide switch selecting either Teacher-A Mode or Teacher-B Mode. One of the belt-packs can be designated as Teacher-A and the other as Teacher-B. For the system to operate properly the mode of the RF4CE should match the user's belt-pack designation.

"PAIR" button & LED: Push-button switch to initiate RF4CE pairing process between the base station and the remote control unit.

Exemplary Front Panel Remote Controls:

Belt-Pack Section Controls: (upper section of front panel)

"MUTE" button: When pressed, this causes the muting of the microphone element for the matching headset boom mic and desirably regardless of what audio links are, or are not, currently established. "MUTE" button can be lighted red when the headset mic is muted and is unlighted all other times.

Pressing "MUTE" again, or pressing "ALL" in this embodiment desirably automatically un-mutes the headset boom mic. However, the mute mode can, in this embodiment, be reentered again at any time without changing the audio link state.

Volume Control

Buttons: The increase volume button can cause an increase in the ear bud speaker volume for the matching belt-pack headset.

The decrease volume button can cause a decrease in the ear bud speaker volume for the matching belt-pack headset.

Pressing the upper volume control buttons can result in a "beep" or often audio signal heard from the ear bud speaker of the matching belt-pack headset. The volume of the "beep" can be proportional to the selected headset's speaker volume level setting. A quick double "beep" or other auditory can be provided when the min or max volume limits are encountered. Visual indicators can alternatively be used.

Pod Section Controls: (Lower Section of Front Panel)

"1", "2", "3", "4"

"5, and 6": When pressed, these desirably select the corresponding speaker pod. Pressing the numbered pod button can allow the headset mic to establish a bidirectional audio link to the selected pod if the belt-pack's mic is not currently in the mute mode (see "MUTE" button above) at which point the numbered pod button can be lighted green. If the belt-pack's mic is in the mute mode, pressing the numbered pod button allows headset mic to monitor the selected pod unheard. The numbered pod button can then be lighted red. The pod can be unselected (and unlighted) by pressing any numbered pod button, or by pressing the "ALL" button.

A numbered pod button can allow the selected pod to talk to all pods, for example if it is pressed immediately after the ALL button (alternatively: if it is pressed and held down for three seconds). In addition to the selected pod, the two teachers' belt-packs can also talk to all pods simultaneously. The microphone elements of the other unselected pods are desirably muted. Both the numbered pod button and the "ALL" button can be lighted green. In this example, the pod can be unselected (and unlighted) by pressing any numbered pod button in this example, or by pressing the "ALL" button.

Both teachers desirably can establish their own link to the same pod at the same time. This sets up a three way conversation between the two teachers and the student group around the pod.

"ALL" button: Allows both of the teachers' belt-packs to talk to all pods in this example. During the "ALL" operation, the audio signals applied to the two AUX audio inputs desirably will also be sent to all pods. The microphone elements in the pods are desirably muted. The "ALL" button can be lighted green when the "ALL" operation is active.

Pressing a numbered pod button immediately after the ALL button (alternatively: pressing a numbered pod button and holding it down for three seconds) can allow the selected pod to enter the "ALL" mode and to thus talk to all of the pods. In addition to the selected pod, the two teachers' belt-packs and the AUX audio inputs can also be heard at all pods simultaneously. The microphone elements of the other pods can be muted under these conditions. Both the numbered pod button and the "ALL" button are desirably lighted green in this case.

As is apparent, other control scenarios can be used as the system is flexible. EEPROM programming, via (for example) JTAG inputs (or alternative programming), can be used to program the circuits included in the speaker units, base unit, belt pack and remote controls.

The system can also comprise power saver modes, for example with the remote control and other components being disconnected automatically when being charged and/or disconnected after a period of inactivity (e.g. two hours).

Figure 15:
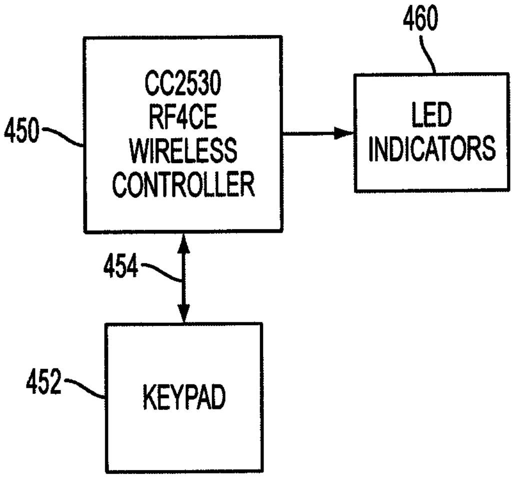
FIG. 15 illustrates an exemplary circuit architecture for one suitable remote control.

FIG. 15 illustrates an exemplary architecture for one suitable remote control. In the illustrated embodiment of FIG. 15, a wireless controller is included, in this case one that implements RF4CE technology. A specific example is a CC2530 system-on-chip solution for implementing 2.4 IEEE 802.15.4 communications. A data entry device 452, such as a keypad as previously described or other data entry device, is coupled via a line 454 to the controller 450 for providing control inputs to the controller. The block 460 indicates the LED indicators such as discussed above.

Figure 16A:
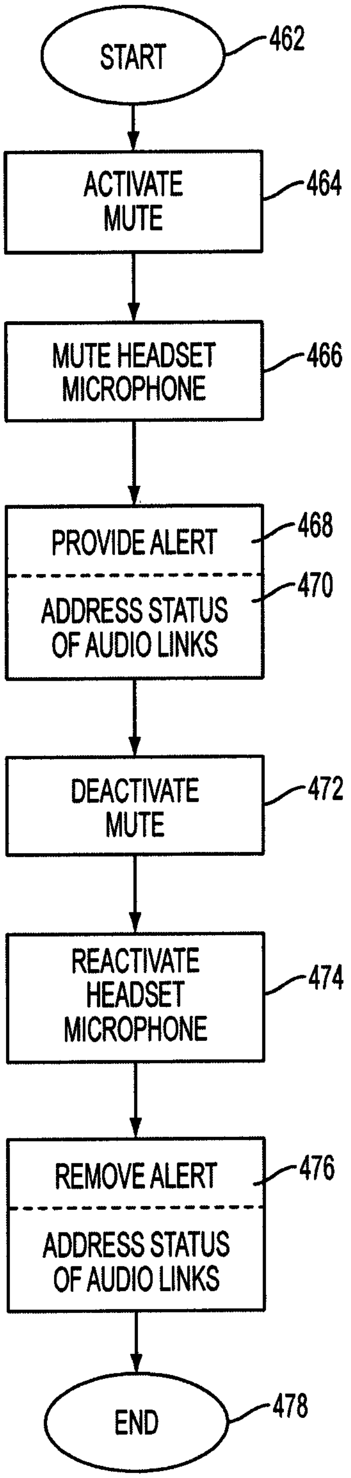
FIG. 16A illustrates an example of a method of handling muting of the microphone of an instructor unit.

FIG. 16A provides an example of an approach for handling muting of the microphone of an instructor unit. In this example, the process starts at 462 and moves to a block 464 at which a an activate mute command is provided. In response, at block 466 the headset microphone is muted. At block 468 an optional alert is provided to the instructor, such as using an LED indicator, to indicate that the headset microphone has been muted. The status of the various audio links can also be addressed at this time and tracked. At block 472, a deactivate mute command is provided and at block 474 the headset microphone is reactivated. The deactivate mute command at block 472 can be inputted, for example, in response to re-pushing the "MUTE" button, pushing an "ALL" button and/or pushing a "MIC TO MIC" button. Upon reactivation of the headset microphone, the alert can be removed at block 476 (for example an LED can change from red to green) and the status of the audio links can be addressed. Desirably there is no change of the state of the audio links during the mute and unmuting of the microphone headset. Alternatively, default audio link statuses can be implemented when the headset microphone is muted. At block 478 the process is completed.

Figure 16B:
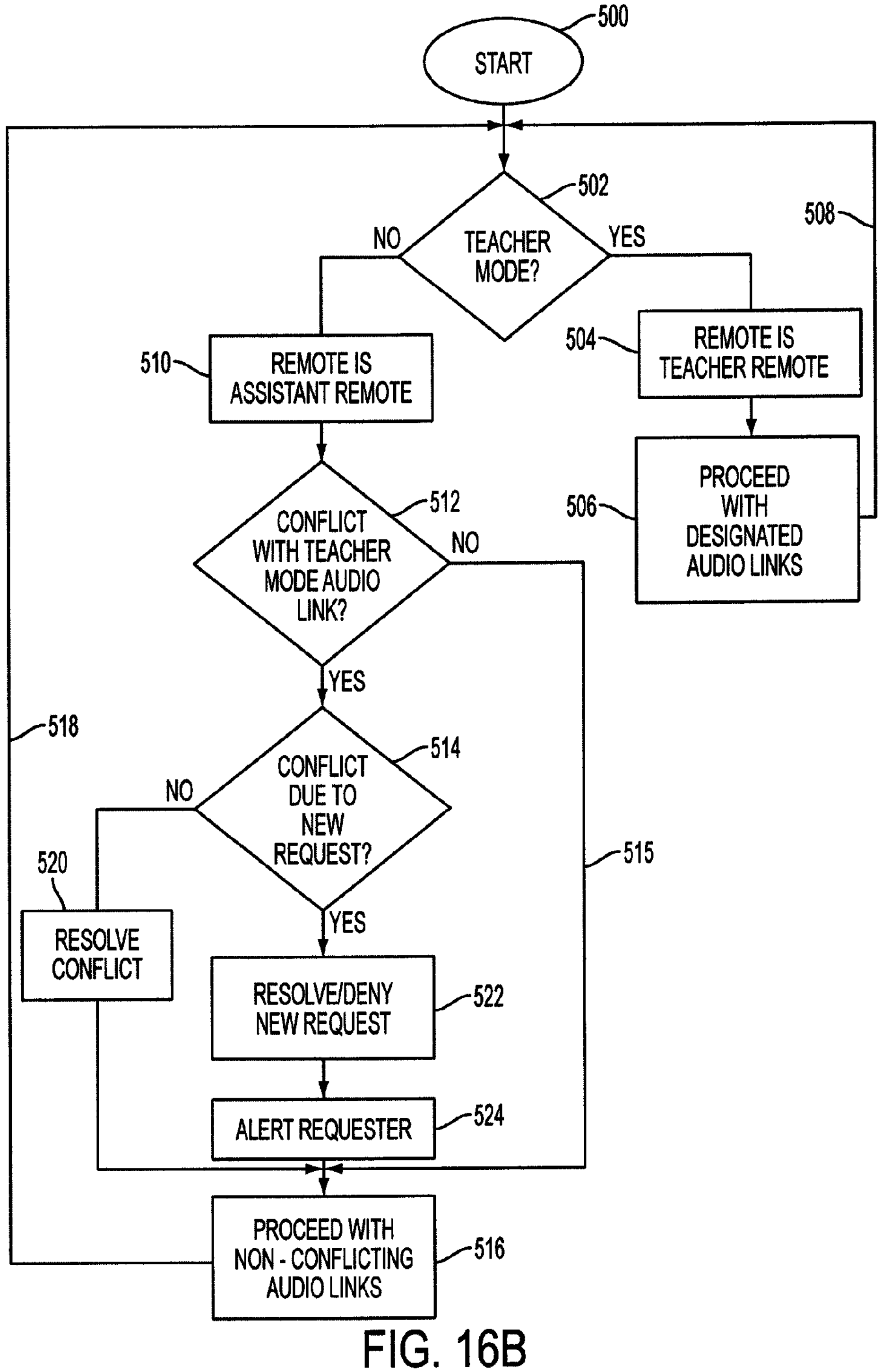
FIG. 16B illustrates an exemplary method for resolving conflicts between control signals from a remote control from a teacher and from an assistant teacher.

FIG. 16B illustrates an exemplary approach for resolving conflicts between control signals from a remote control from a teacher and from an assistant teacher (between the dominant remote control and a subordinate remote control).

The process of FIG. 16B starts at block 500 and moves to a block 502 at which a determination is made as to whether a particular remote is in a teacher mode (indicating the remote control is a dominant remote control) or an assistant mode (indicating the remote control is a subordinate remote control). If the answer at block 502 is yes, a block 504 is reached indicating that the remote control is a teacher (dominant) remote control. At block 506 the system proceeds with the audio links designated by the remote control and returns via the line 508 to the block 502.

In contrast, if at block 502 the remote is determined to not be the dominant remote control, a block 510 is reached indicating a determination has been made that the remote control is an assistant remote control. At block 512 a determination is made as to whether there is a conflict between a control signal from the assistant remote and a control signal from the teacher remote control. If the answer is no, a line 515 is followed to a block 516 and the process proceeds with implementing the requested audio links as no conflict exists. From block 516 a line 518 is followed back to the block 502.

If at block 512, a conflict is determined to exist, a block 514 is reached. Instead of reaching block 514, the process from the yes output of block 512 can proceed at block 516 with only the non-conflicting audio links being implemented. However, if block 514 is included, a determination is made at this block as to whether the conflict is due a new request. If the answer is no, a conflict resolution block 520 is reached and the conflict is resolved, such as by denying the audio link request from the non-teacher remote. From block 520, a block 516 is reached and the process continues. Note: conflicts can be resolved at block 520 in other manners. For example, the system can be set up to allow the assistant remote to have control over specific speaker pods, for example small groups which are specifically under the assistant teacher's direct responsibility. If at block 514 a new request is determined to exist, a block 522 is reached and the conflict is resolved (for example the new request is denied) or another resolution is achieved, such as described above in connection with block 520. In this example, a block 524 can be reached at which the audio link requestor is alerted that a conflict has been found to exist. This will give the requestor the option of approaching the teacher (either directly or via the instructor to instructor audio pathway) to discuss how to proceed.

The base unit, for example, can evaluate and resolve conflicts as it can be positioned to receive the control signals from the remote controls.

FIGS. 17-31 provide examples showing the flexibility of the system disclosed herein in communicating with a variety of instructional groups and in connection with other scenarios. In these embodiments, systems are shown with two base units being used.

Figure 17:
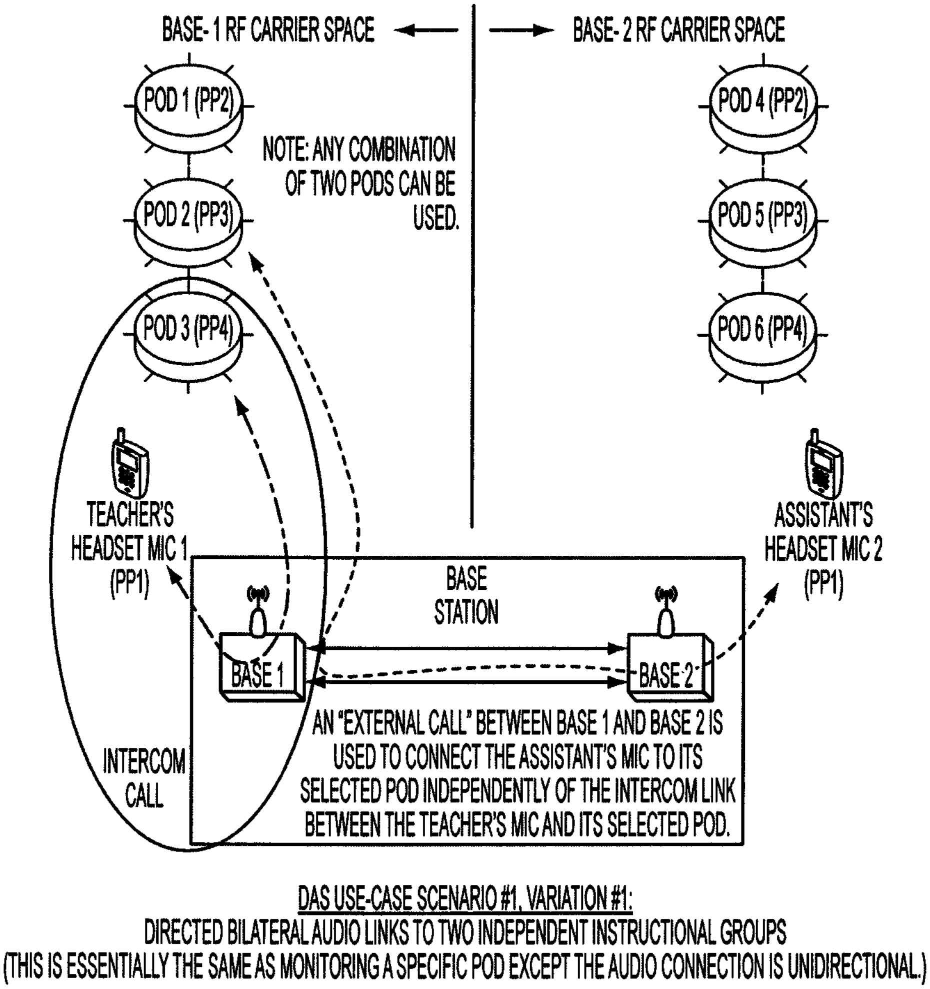
FIG. 17 illustrates an embodiment of a teacher communicating via a first base unit (base 1) to a speaker pod.

In the embodiment of FIG. 17, a teacher is shown communicating via a first base unit (base 1) with speaker pod 3. At the same time, an assistant teacher is shown communicating from the assistant teacher's headset via base 2 and base 1 to speaker pod 2. This communication from the assistant teacher is occurring independently of the audio link between the teacher's headset microphone and its selected speaker pod, namely speaker pod 3. It should be noted that a system can be programmed (e.g. in response to depressing buttons for more than one speaker pod simultaneously) to communicate with a plurality of pods that are less than all of the pods if desired.

Figure 18:
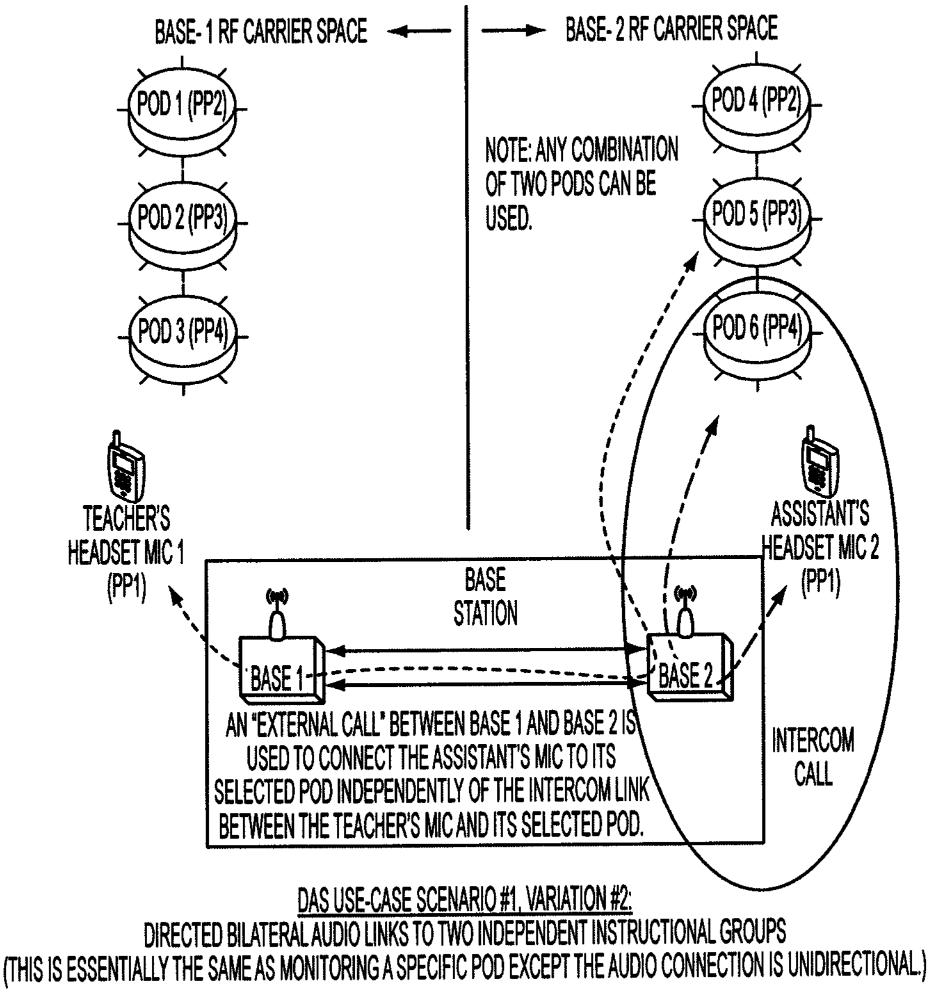
FIG. 18 illustrates an embodiment of an assistant communicating via a second base unit to a selected speaker pod.

In the embodiment of FIG. 18, the assistant is communicating via a base unit 2 to a selected speaker pod 6. Simultaneously, the teacher is communicating via base 1 and a base 2 to a selected speaker pod 5 in the base 2 RF carrier space. Thus, the assistant is communicating to a selected pod independently of the intercom link between the teacher's microphone and its selected pod.

Figure 19:
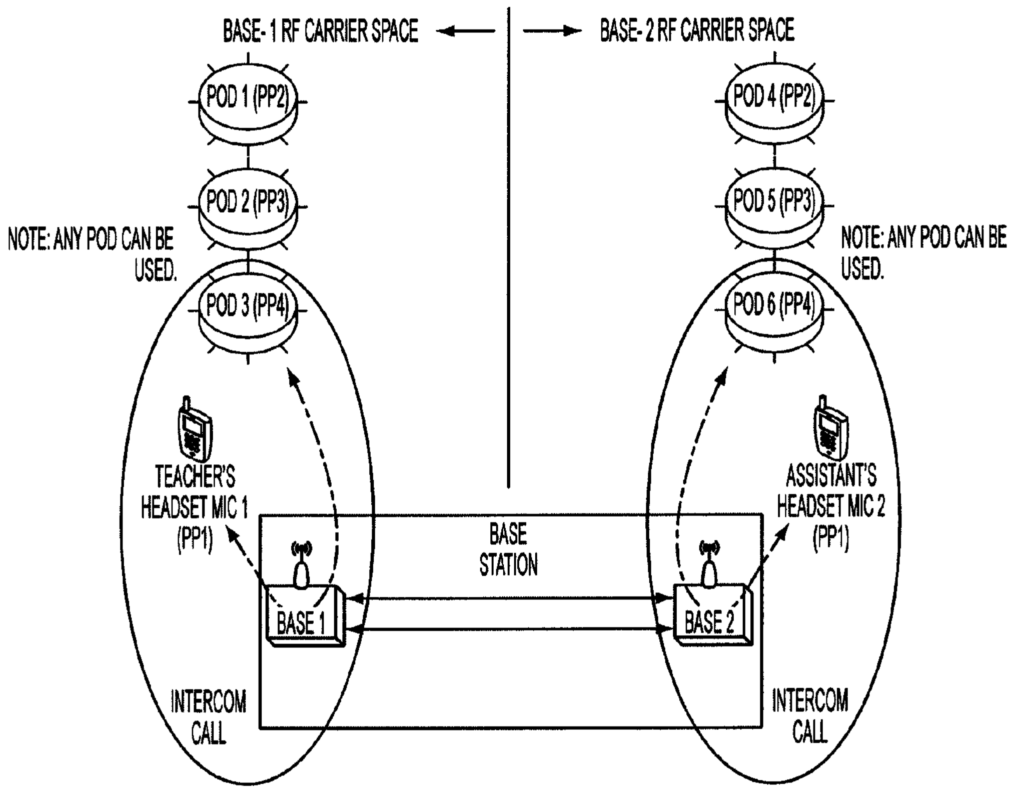
FIG. 19 illustrates an embodiment of a teacher communicating via first and second base units to a selected pod in the second base unit RF carrier space.

In FIG. 19, both the teacher and assistant are communicating with respective selected pods independently of one another with the teacher communicating via base 1 to a selected pod 3 in the base 1 RF carrier space and the assistant communicating via base 2 to a selected pod 6 in the base 2 RF carrier space.

Figure 20:
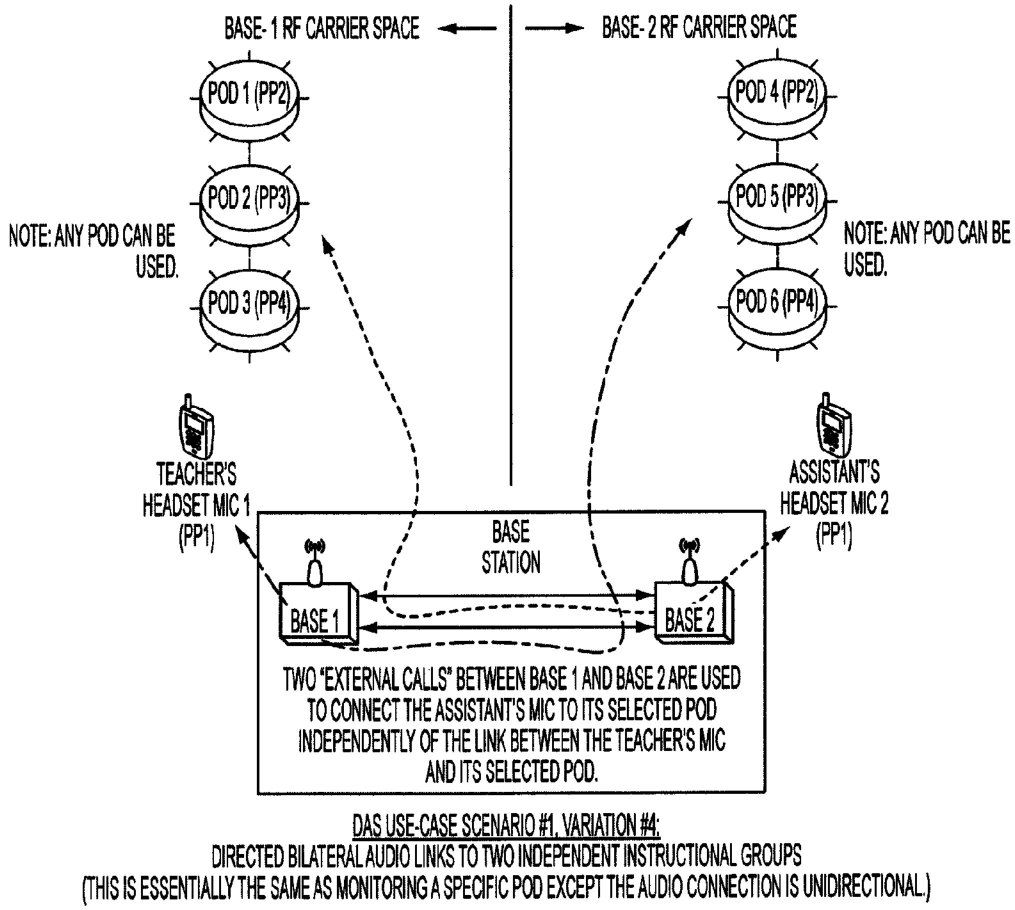
FIG. 20 illustrates an embodiment of a teacher communicating via first and second base units to a selected speaker pod.

In FIG. 20, the teacher is communicating via base 1 and base 2 to a selected pod 5 in the base 2 RF carrier space. At the same time, the assistant is communicating via base 2 and base 1 to a selected pod 2 in the base 1 RF carrier space.

Figure 21:
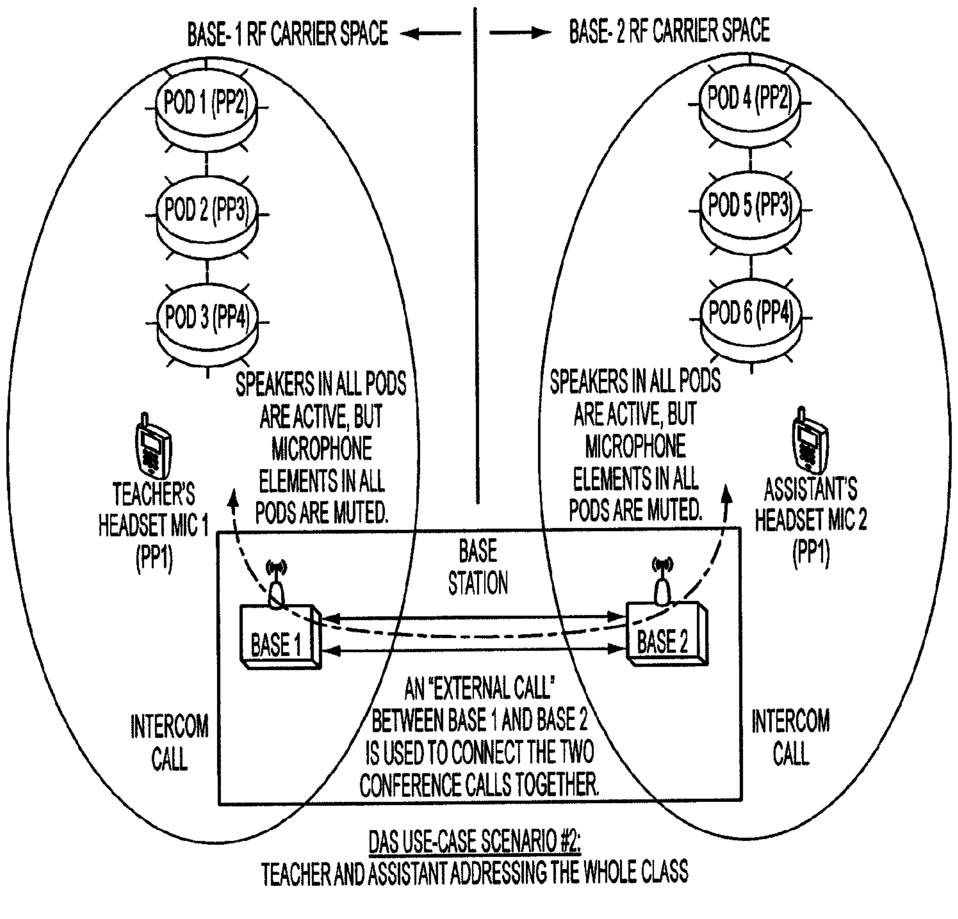
FIG. 21 illustrates an embodiment showing an assistant addressing the entire group of pods in two RF carrier spaces using first and second base stations.

In FIG. 21, the assistant is addressing the entire class in both carrier spaces via base 2 for speaker pods in the base 2 RF carrier space and via base 1 to the speaker pods in the base 1 RF carrier space.

Figure 22:
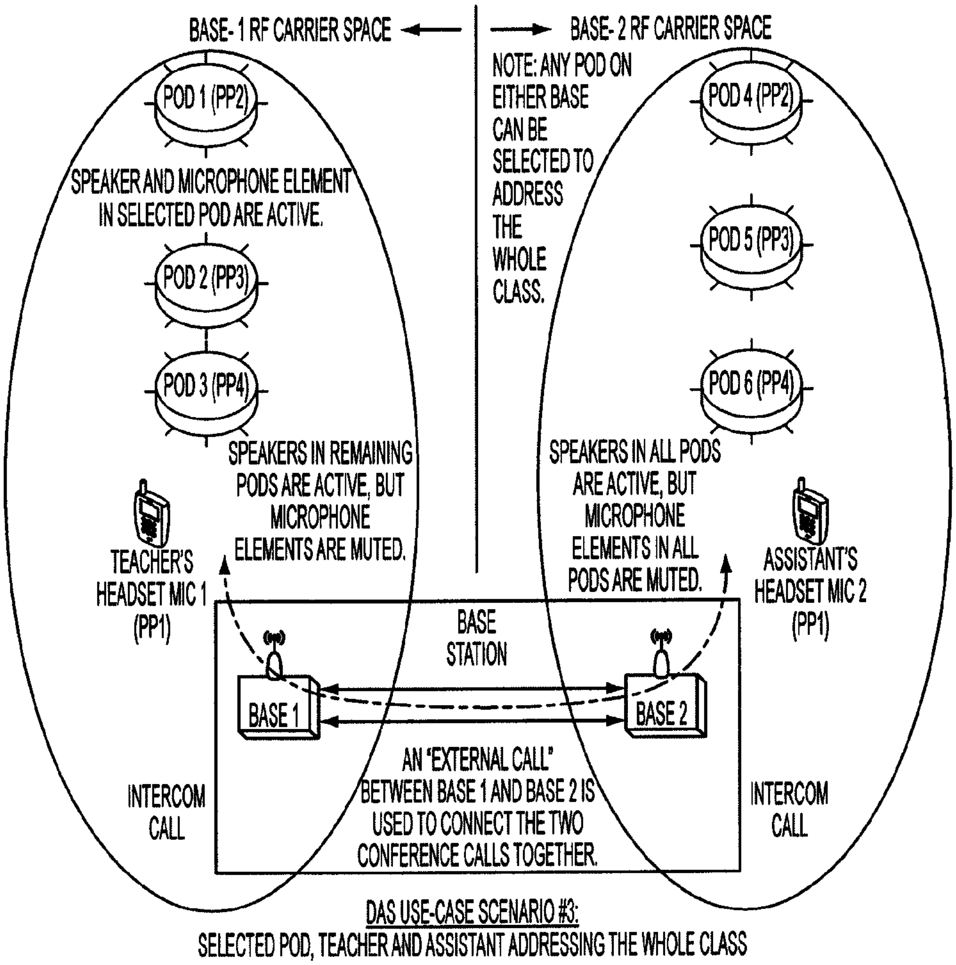
FIG. 22 illustrates an embodiment showing both a teacher and assistant addressing the entire group of pods in two RF carrier spaces.

In the example of FIG. 22, both the teacher and the assistant are shown addressing the entire class. A call between base 1 and base 2 connects the two conference calls together. In addition, in this example a single pod can be selected to address the entire class.

Figure 23:
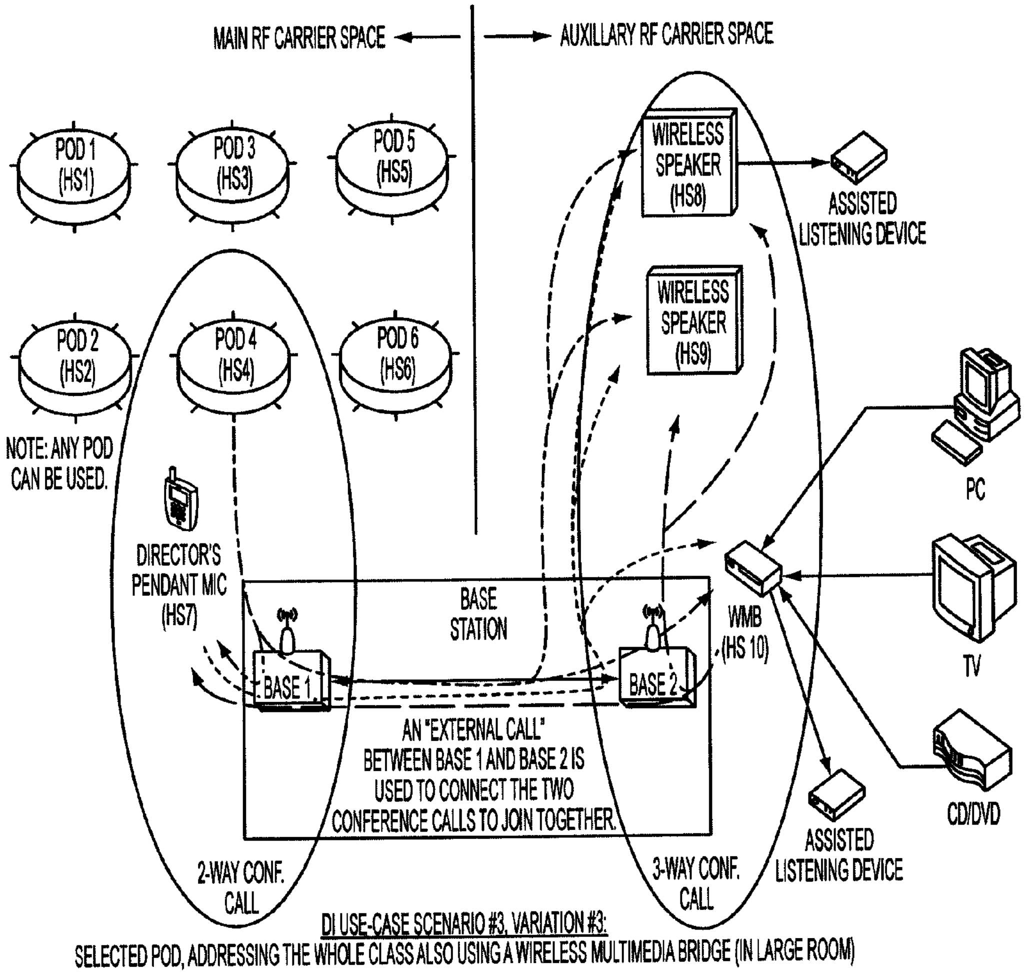
FIG. 23 illustrates a selected pod addressing an entire group using a wireless multimedia bridge.

In the example of FIG. 23, a selected pod is shown addressing the entire class using a wireless multimedia bridge.

Figure 24:
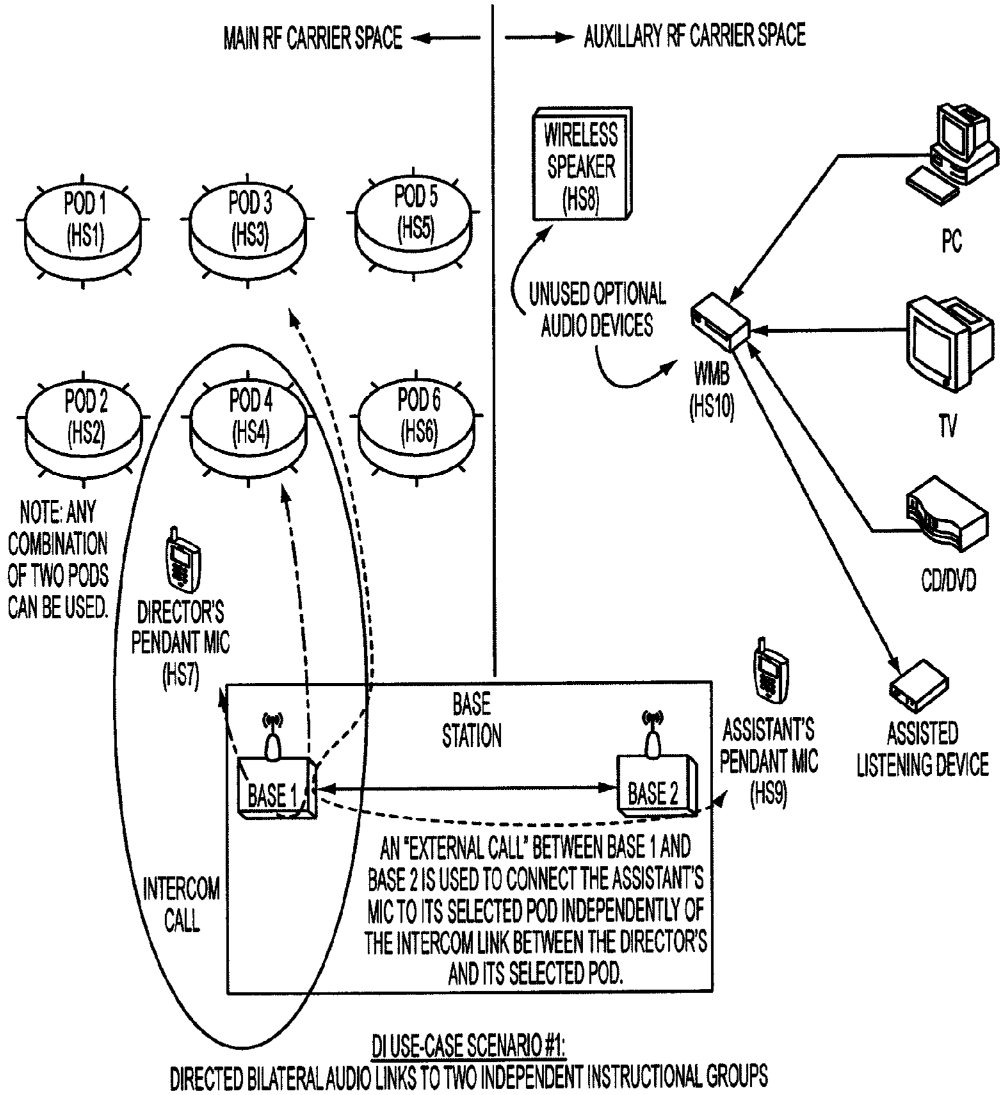
FIG. 24 illustrates an embodiment of a teacher addressing a selected speaker pod via a first base unit and an assistant addressing a different selected speaker pod via a second base unit and the first base unit.

In the example of FIG. 24, the teacher is addressing a selected pod 4 via the base 1 and the assistant is addressing a different selected pod 3 via the base 2 and base 1, pod 3 being in the same RF carrier space as pod 4.

Figure 25:
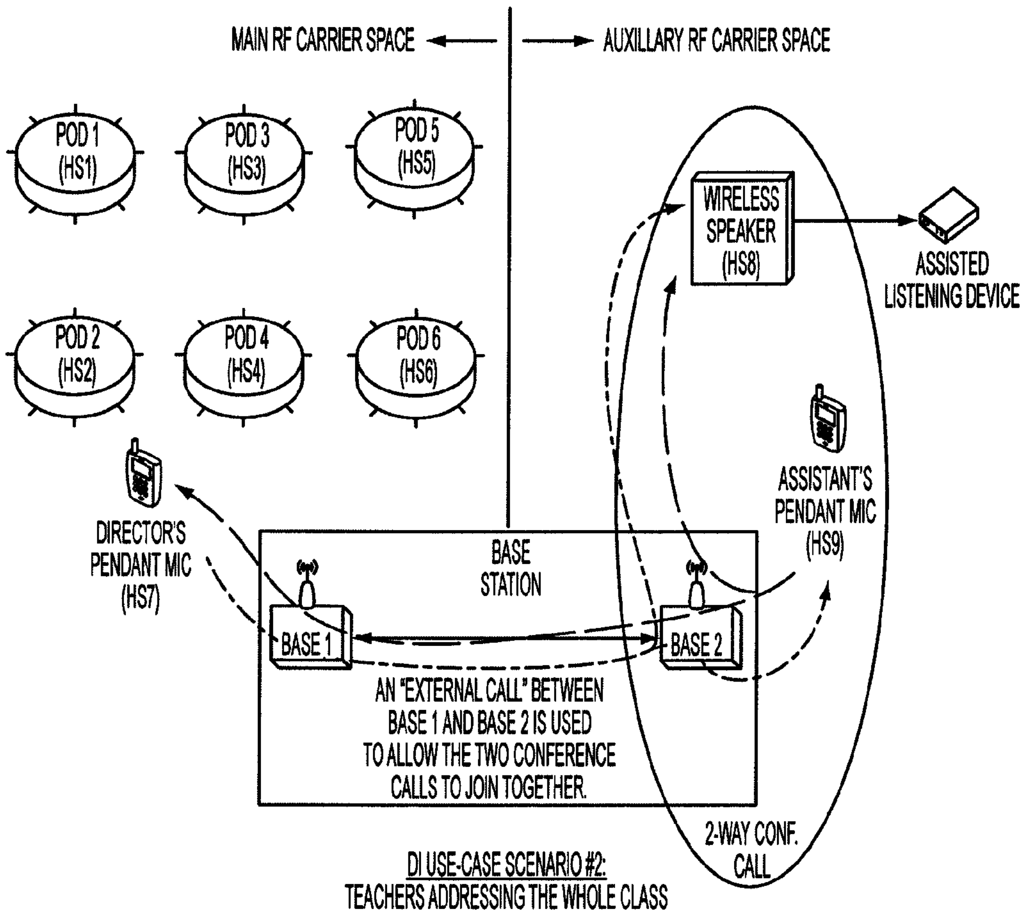
FIG. 25 illustrates an embodiment wherein a teacher and assistant are addressing an entire group utilizing two base units.

FIG. 25 illustrates an example wherein both teachers are addressing the entire class utilizing two base units and showing the assistant and teacher utilizing pendant microphone units instead of headsets.

Figure 26:
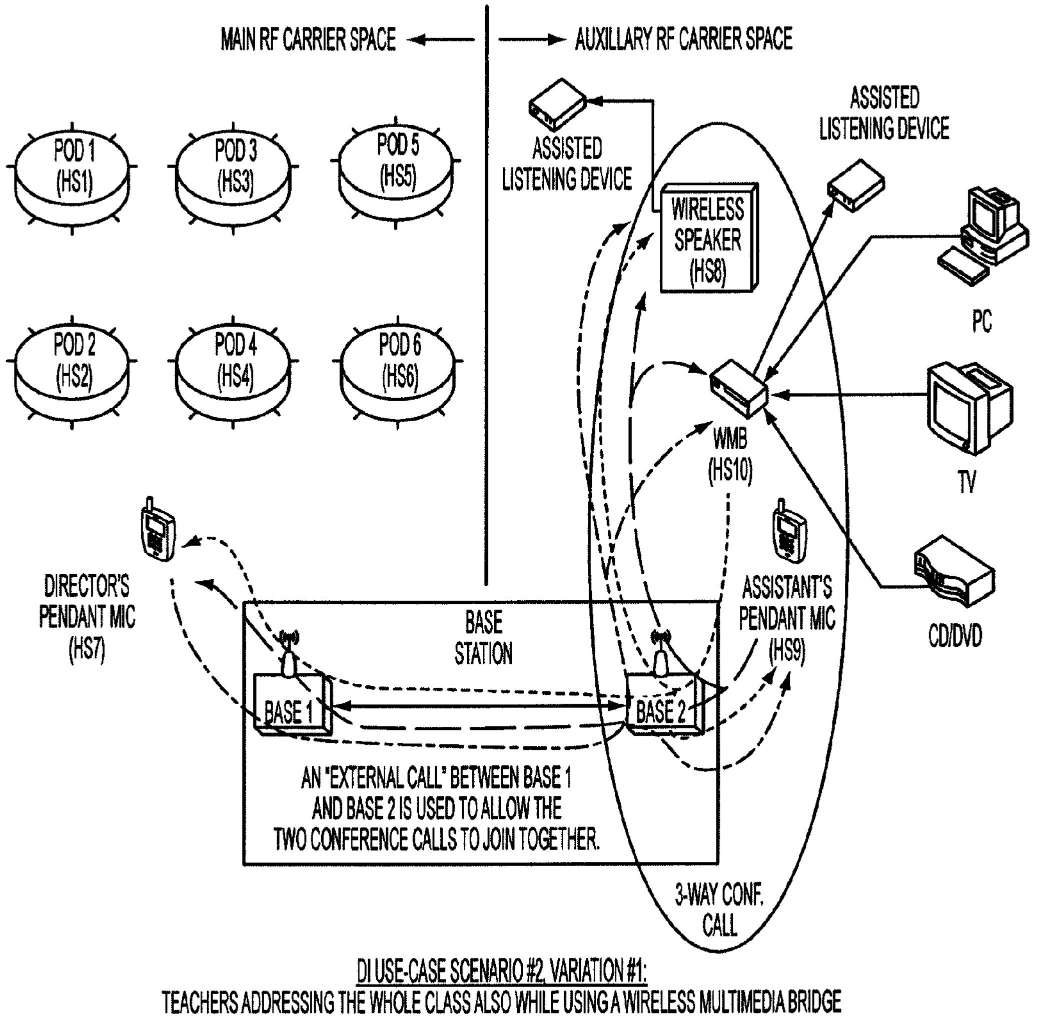
FIG. 26 illustrates an embodiment wherein a teacher and assistant are addressing an entire group while also using a wireless multimedia bridge.

FIG. 26 illustrates an example wherein the teachers are addressing the whole class while also using a wireless multimedia bridge.

Figure 27:
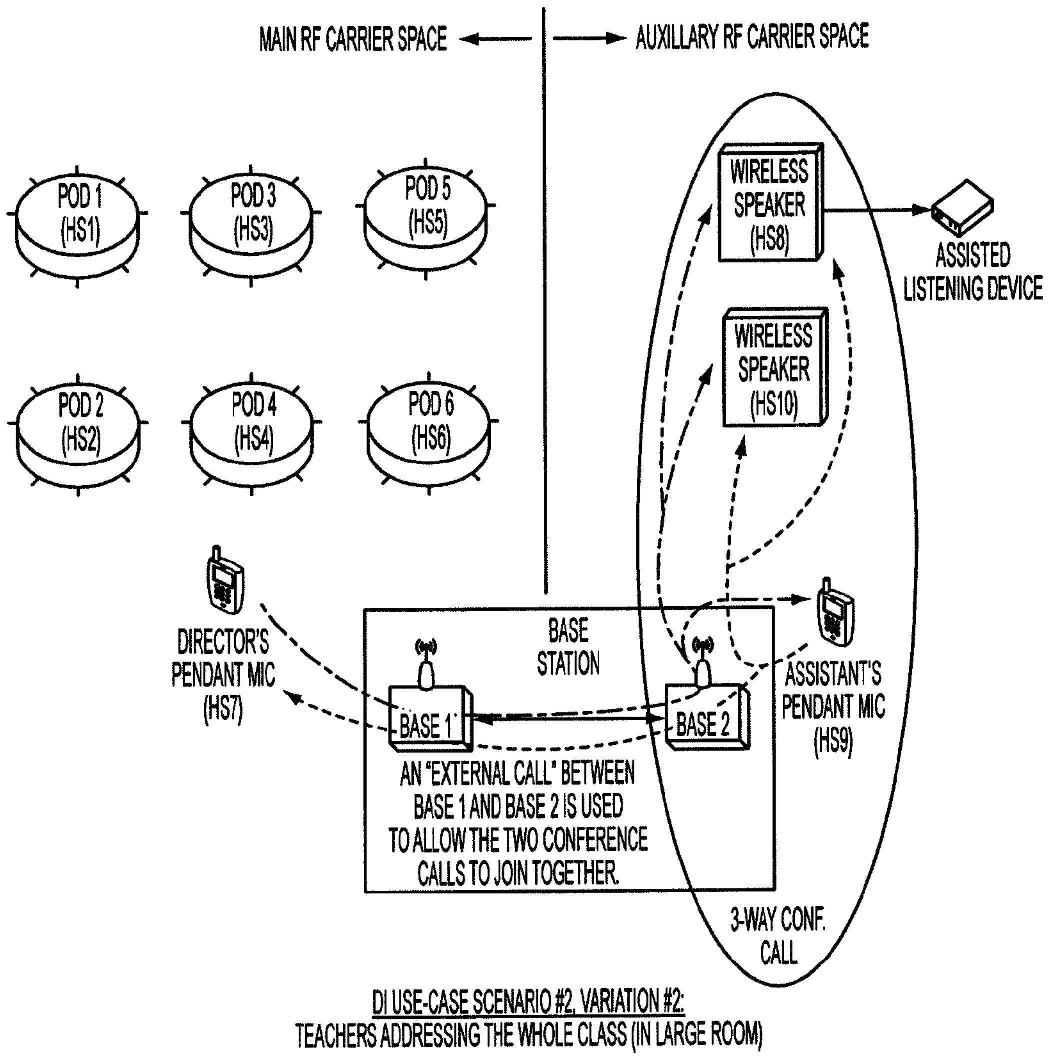
FIG. 27 illustrates an embodiment wherein a teacher (director) and assistant are addressing an entire group in a large room.

FIG. 27 illustrates an example where the teachers are addressing the entire class in a large room.

Figure 28:
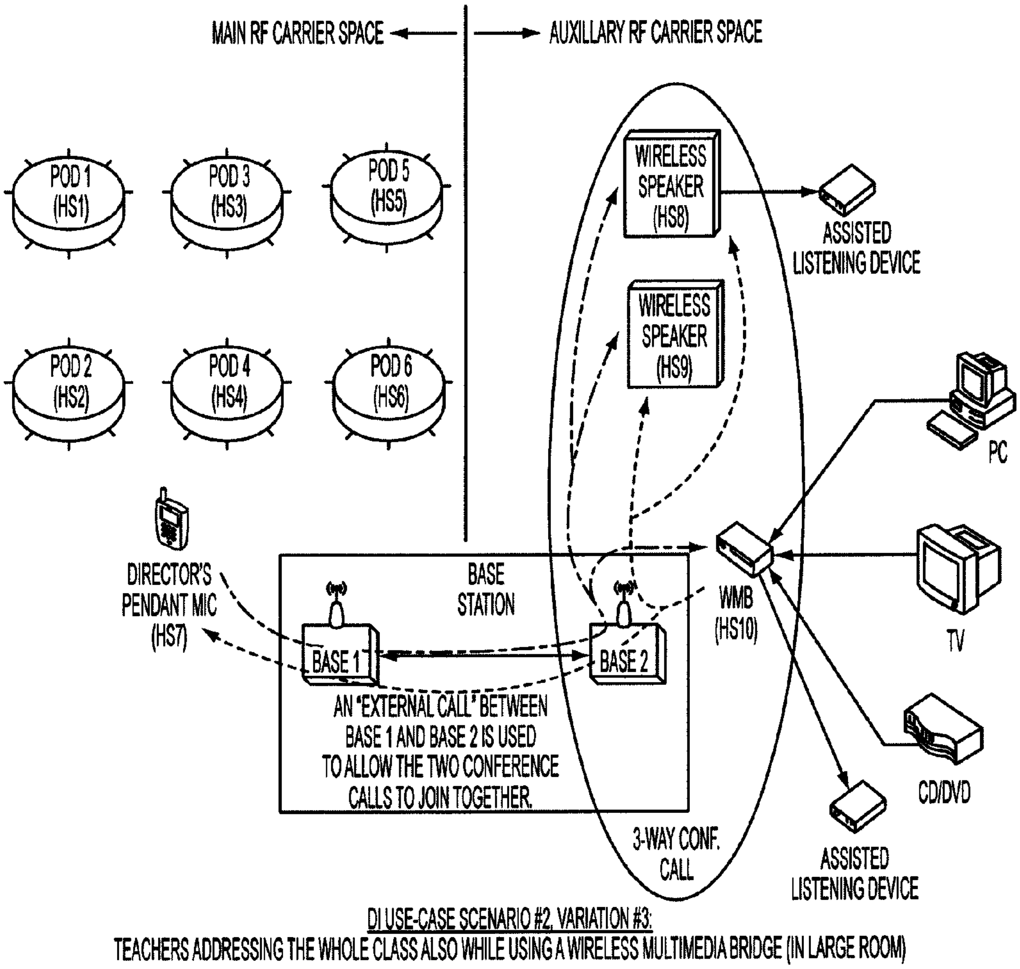
FIG. 28 illustrates an embodiment wherein a teacher is addressing an entire group while also using a wireless multimedia bridge.

FIG. 28 illustrates an example where the teacher is addressing the whole class while also using a wireless multimedia bridge.

Figure 29:
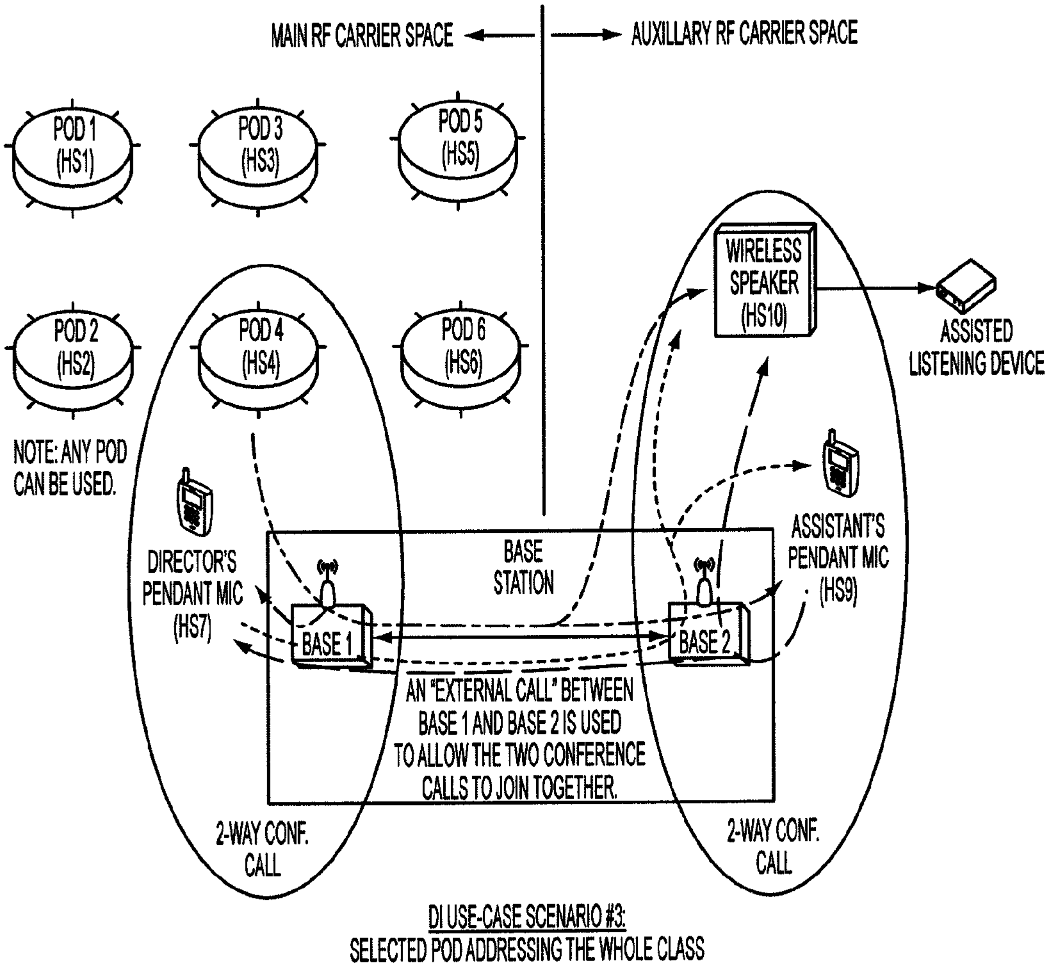
FIG. 29 illustrates an embodiment wherein a selected speaker pod is being used to address an entire group.

FIG. 29 is an example where a selected speaker pod is addressing the entire class.

Figure 30:
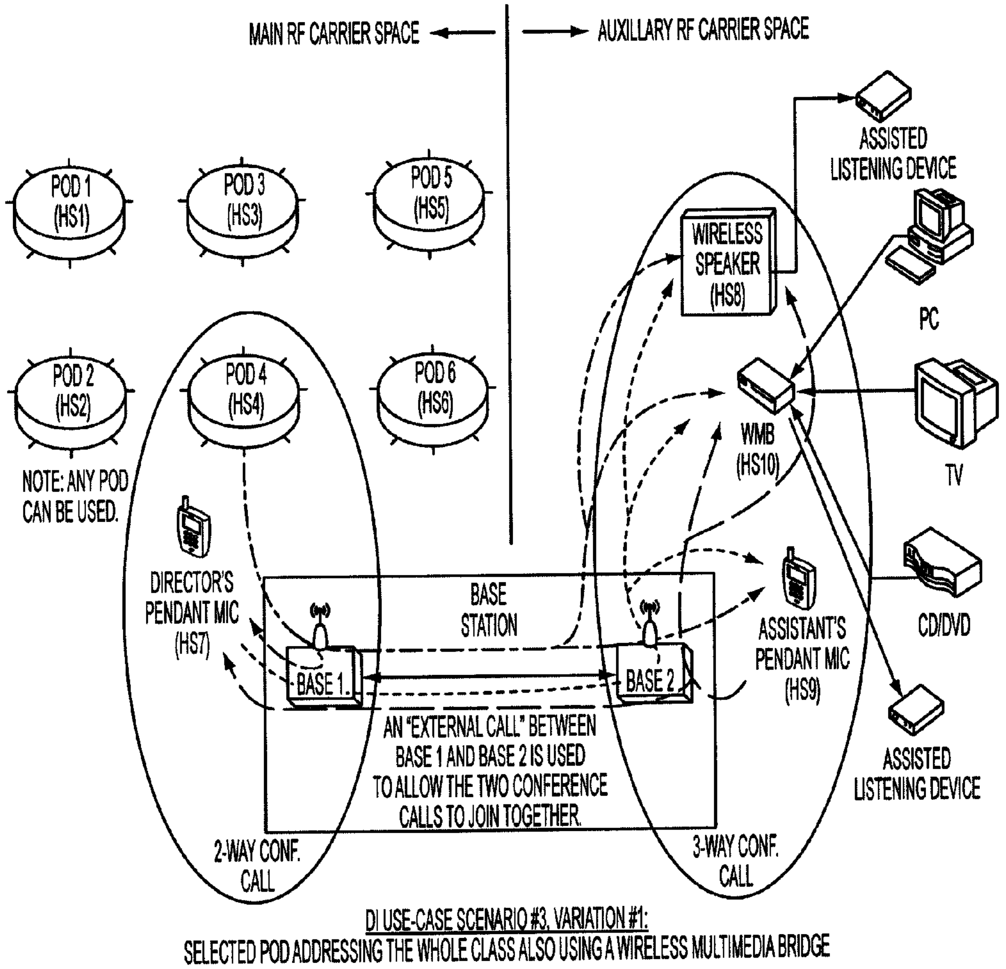
FIG. 30 illustrates an embodiment wherein a selected speaker pod is shown being used to address an entire group and also using a wireless multimedia bridge.

FIG. 30 is an example where a selected pod is shown addressing an entire class also using a wireless multimedia bridge.

Figure 31:
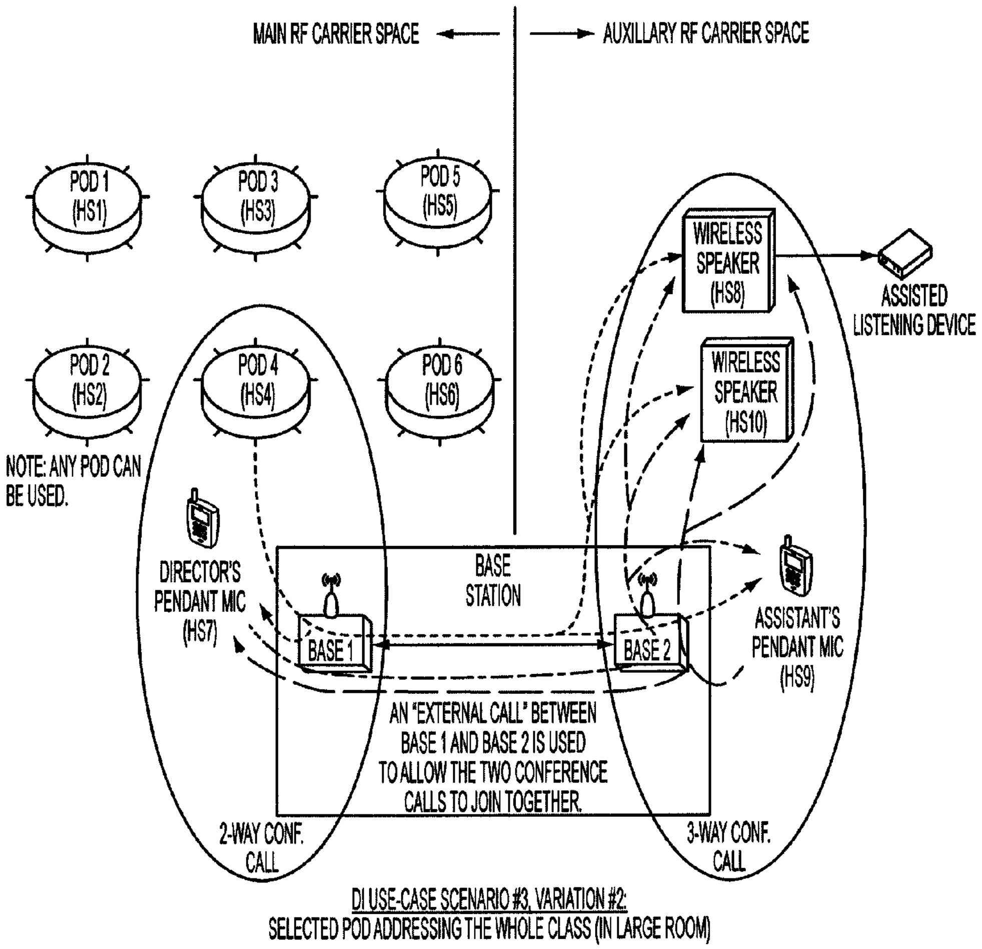
FIG. 31 illustrates an embodiment wherein a selected speaker pod is shown addressing an entire group in a large room.

FIG. 31 is an example where a selected pod is shown addressing an entire class in a large room.

The examples of FIGS. 17-31 illustrate situations where more than one base unit is used to provide added usability to the system.

Having illustrated and described the principles of our invention with reference to a number of embodiments, it should be apparent that those of ordinary skill in the art that these embodiments be modified in arrangement and detail without departing from the inventive principles disclosed herein. We claim all such modifications as follows within the scope of the claims set forth below.

We claim:

1. A distributed audio system comprising:

plural speaker units, each speaker unit comprising a wireless speaker unit receiver and a wireless speaker unit transmitter, a speaker unit speaker coupled to the speaker unit receiver and a speaker unit microphone coupled to the speaker unit transmitter, the speaker unit receiver being operable to receive wireless audio information signals for delivery by the speaker unit speaker as audio, the speaker unit transmitter receiving audio information corresponding to audio detected by the speaker unit microphone for transmission by the speaker unit transmitter as audio information signals;

at least one instructor unit comprising a wireless instructor unit receiver and a wireless instructor unit transmitter, an instructor unit speaker coupled to the instructor unit receiver and an instructor unit microphone coupled to the instructor unit transmitter, the instructor unit receiver being operable to receive wireless audio information signals for delivery by the instructor unit speaker as audio, the instructor unit transmitter receiving audio information corresponding to audio detected by the instructor unit microphone for transmission by the instructor unit transmitter as audio information signals;

a base unit comprising at least one wireless base unit transmitter operable to transmit audio information signals and at least one wireless base unit receiver operable to receive audio information signals, the base unit being operable in response to control signals to selectively route the audio information signals along respective audio pathways, the audio pathways comprising respective instructor unit to speaker unit audio pathways between the instructor unit and the speaker units via the instructor unit microphone, the instructor unit transmitter, the base unit receiver, the base unit transmitter, the speaker unit receiver of each speaker unit and to the speaker unit speaker of each speaker unit, the audio pathways comprising respective speaker unit to instructor unit audio pathways between the speaker units and the instructor unit via the speaker microphone of each speaker unit, the speaker unit transmitter of each speaker unit, the base unit receiver, the base unit transmitter, the instructor unit receiver and to the instructor unit speaker, and the audio pathways comprising speaker unit to speaker unit pathways between respective speaker units, each such speaker unit to speaker unit audio pathway being via the speaker microphone of one of the speaker units, the speaker unit transmitter of the said one of the speaker units, the base unit receiver, the base unit transmitter, the speaker unit receiver of another of the speaker units other than said one speaker unit and the speaker unit speaker of said other of the speaker units;

a remote control comprising a wireless transmitter operable to transmit control signals to the base unit receiver, the base station unit, in response to the received control signals, being operable to selectively control the delivery of audio information signals along the audio pathways to and from the instructor unit to the speaker units, to and from the speaker units to the instructor unit, and to and from one or more speaker units to one or more other speaker units; and wherein, in response to control signals from the remote control, the speaker to speaker audio pathways are open, a respective one of the speaker units is selected, and the speaker unit to instructor unit audio pathway for the selected speaker is open, such that audio detected by the speaker microphone of the selected one of the speaker units is provided as audio at the speaker unit speakers of the speaker units other than the speaker unit speaker of the selected speaker unit and also at the instructor unit speaker.

2. A distributed audio system according to claim 1 wherein, in response to signals from the remote control, an audio pathway is selected such that only one individual speaker unit is selected to deliver audio from the speaker unit speaker of the selected speaker unit corresponding to audio detected by the instructor unit microphone.

3. A distributed audio system according to claim 1 wherein, in response to a control signal from the remote control, audio pathways are selected such that all of the speaker units are selected for delivery of audio from the speaker unit speakers of the speaker units corresponding to audio detected by the instructor unit microphone.

4. A distributed audio system according to claim 1 wherein, in response to a mute control signal from the remote control, all of the instructor unit to speaker unit audio pathways are blocked, and, in response to a select speaker unit signal from the remote control that designates a selected speaker unit, all of the speaker unit to instructor unit audio pathways are blocked except the speaker unit to instructor unit audio pathway that includes the designated selected speaker unit, such that audio detected by the speaker microphone of the designated selected speaker unit is provided as audio at the instructor unit speaker.

5. A distributed audio system according to claim 1 wherein, in response to a mute all control signal from the remote control, all of the speaker unit to instructor unit audio pathways are blocked to prevent the delivery of audio detected by the speaker unit microphones of the speaker units to the instructor unit speaker and all of the speaker unit to speaker unit audio pathways are blocked to prevent the delivery of audio detected by the speaker unit microphones to speaker unit speakers, and, in response to a select all speaker units control signal from the remote control, all of the instructor unit to speaker unit audio pathways are open such that audio detected by the microphone of the instructor unit is delivered as audio at the speaker unit speakers.

6. A distributed audio system according to claim 1 comprising first and second said instructor units and the audio pathways comprise instructor unit to instructor unit pathways, each instructor unit to instructor unit pathway comprising a pathway from the microphone of one of said first and second instructor units, to the transmitter of said one of said first and second instructor units, to the receiver of the other of the first and second instructor units other than said one of said first and second of said instructor units and to the instructor unit speaker of the other of said first and second instructor units.

7. A distributed audio system according to claim 6, wherein the response to control signals from the remote control, at least one of the instructor unit to instructor unit audio pathways is open to permit audio detected by at least one of the instructor unit microphones of the first and second instructor units to be delivered as audio at the instructor unit speaker of the other of the first and second instructor units.

8. A distributed audio system according to claim 6 wherein there is only one base station and wherein there are first and second of said remote controls communicating with a said one base station, the first remote control being associated with the first instructor unit and the second remote control being associated with the second instructor unit, wherein one of said first and second instructor units is a dominant instructor unit and, wherein remote control signals from the first remote control are followed and conflicting remote control signals from the second remote control are ignored in the event of a conflict between remote control signals from the first and second remote controls.

9. A distributed audio system according to claim 1 wherein the speaker unit speaker of each speaker unit is a balance mode radiator speaker or distributed mode speaker operable to deliver audio at level in the range of from about 60 dB to 80 dB at a distance of about four feet from the speaker.

10. A distributed audio system according to claim 1 wherein each speaker unit comprises a speaker unit housing supporting a speaker unit speaker to face upwardly.

11. A distributed audio system according to claim 1 wherein the speaker unit comprises at least one assisted learning device outlet through which audio information can be transmitted to an assisted learning device coupled to the assisted learning device outlet.

12. A distributed audio system according to claim 1 wherein the speaker units are portable.

13. A distributed audio system according to claim 12 wherein the base unit comprises speaker unit receptacles for selective coupling to the speaker units to store the speaker units prior to positioning speaker units remotely from the base unit.

14. A distributed audio system comprising:

plural speaker units, each speaker unit comprising a wireless speaker unit receiver and a wireless speaker unit transmitter, a speaker unit speaker coupled to the speaker unit receiver and a speaker unit microphone coupled to the speaker unit transmitter, the speaker unit receiver being operable to receive wireless audio information signals for delivery by the speaker unit speaker as audio, the speaker unit transmitter receiving audio information corresponding to audio detected by the speaker unit microphone for transmission by the speaker unit transmitter as audio information signals;

at least one instructor unit comprising a wireless instructor unit receiver and a wireless instructor unit transmitter, an instructor unit speaker coupled to the instructor unit receiver and an instructor unit microphone coupled to the instructor unit transmitter, the instructor unit receiver being operable to receive wireless audio information signals for delivery by the instructor unit speaker as audio, the instructor unit transmitter receiving audio information corresponding to audio detected by the instructor unit microphone for transmission by the instructor unit transmitter as audio information signals;

a base unit comprising at least one wireless base unit transmitter operable to transmit audio information signals and at least one wireless base unit receiver operable to receive audio information signals, the base unit being operable in response to control signals to selectively route the audio information signals along respective audio pathways, the audio pathways comprising respective instructor unit to speaker unit audio pathways between the instructor unit and the speaker units via the instructor unit microphone, the instructor unit transmitter, the base unit receiver, the base unit transmitter, the speaker unit receiver of each speaker unit and to the speaker unit speaker of each speaker unit, the audio pathways comprising respective speaker unit to instructor unit audio pathways between the speaker units and the instructor unit via the speaker microphone of each speaker unit, the speaker unit transmitter of each speaker unit, the base unit receiver, the base unit transmitter, the instructor unit receiver and to the instructor unit speaker, and the audio pathways comprising speaker unit to speaker unit pathways between respective speaker units, each such speaker unit to speaker unit audio pathway being via the speaker microphone of one of the speaker units, the speaker unit transmitter of the said one of the speaker units, the base unit receiver, the base unit transmitter, the speaker unit receiver of another of the speaker units other than said one speaker unit and the speaker unit speaker of said other of the speaker units;

a remote control comprising a wireless transmitter operable to transmit control signals to the base unit receiver, the base station unit, in response to the received control signals, being operable to selectively control the delivery of audio information signals along the audio pathways to and from the instructor unit to the speaker units, to and from the speaker units to the instructor unit, and to and from one or more speaker units to one or more other speaker units; and wherein the base station comprises a housing, the housing comprising a platform portion with a speaker supporting projection extending upwardly from the platform portion, the speaker supporting projection having first and second major wall surfaces having respective first and second wall surface portions that that converge toward one another along at least a portion of the distance from the platform portion to a distal end of the projecting wall such that the first and second wall surface portions are inclined toward one another relative to the platform portion, there being at least first and second speaker units, the first speaker unit comprising a first housing having a first support engaging surface configured to rest at least in part against the first wall surface portion upon storage of the first speaker unit and wherein the second speaker unit comprises a second housing having a second support engaging surface configured to rest at least in part against the second wall surface portion upon storage of the second speaker unit, the platform comprising a first speaker receiving pocket at the base of the first major wall surface and a second speaker receiving pocket at the base of the second major wall surface, first and second speaker engaging electrical charging contacts in the first pocket and first and second speaker engaging electrical charging contacts in the second pocket, the first speaker unit comprising respective first and second speaker charging contacts positioned to engage the respective speaker engaging electrical charging contacts in the first pocket upon storage of the first speaker unit in the first pocket, the second speaker unit comprising respective first and second speaker charging contacts positioned to engage the respective speaker engaging electrical charging contacts in the second pocket upon storage of the second speaker unit in the second pocket.

15. A distributed audio system according to claim 14 wherein the first and second speaker units are each storable in either of the first and second pockets.

16. A distributed audio system according to claim 14 wherein the instructor unit comprises a headset with the instructor unit microphone being supported by the headset and wherein the instructor unit speaker comprises an ear bud speaker supported by the headset, wherein the instructor unit further comprises an instructor unit base portion coupled to the headset, the platform portion comprising at least one remote control storing pocket for receiving the remote control for storing the remote control in a stowed position and at least one instructor unit base portion storing pocket for receiving the instructor base unit for storing the instructor unit base portion in a stowed position, the remote control storing pocket and instructor unit base portion storing pocket each comprising respective electrical charging contacts, the remote control comprising charging contacts positioned to engage the charging contacts of the remote control receiving pocket upon storing of the remote control in the remote control receiving pocket, the instructor unit base portion comprising charging contacts positioned to engage the charging contacts of the instructor base unit storing pocket upon storing the instructor unit base portion in the instructor base unit storing pocket.

17. A distributed audio system according to claim 1 for classroom use by instructors and students in the classroom wherein the plurality of speaker units comprise a plurality of speaker units in a room, the plurality of speaker units being positioned at spaced locations throughout the room during use of the distributed audio system, each of the speaker units being placed adjacent to a separate group of students when in use so that each group of students shares the adjacent speaker unit, the base unit and at least one instructor unit also being located in the room during use of the distributed audio system.

18. A distributed audio system according to claim 17 wherein there are first and second of said distributed audio systems of claim 17 that are each located in a separate classroom space, and wherein the base station of the first distributed audio system is coupled to the base station of the second distributed audio system so as to transmit audio information signals between the first and second base stations and to and from the speaker units and instructor units of the first and second distributed audio systems.

* * * * *